(12) United States Patent
Chen

(10) Patent No.: US 9,091,757 B2
(45) Date of Patent: *Jul. 28, 2015

(54) GNSS ATMOSPHERIC ESTIMATION WITH FEDERATED IONOSPHERIC FILTER

(75) Inventor: Xiaoming Chen, Hoehenkirchen (DE)

(73) Assignee: Trimble Navigation Limited, Sunnyvale, CA (US)

( * ) Notice: Subject to any disclaimer, the term of this patent is extended or adjusted under 35 U.S.C. 154(b) by 469 days.

This patent is subject to a terminal disclaimer.

(21) Appl. No.: 13/117,092

(22) Filed: May 26, 2011

(65) Prior Publication Data

US 2012/0092213 A1  Apr. 19, 2012

Related U.S. Application Data

(60) Provisional application No. 61/396,676, filed on May 30, 2010.

(51) Int. Cl.
 *G01S 13/95* (2006.01)
 *G01S 19/32* (2010.01)
 *G01S 19/44* (2010.01)

(52) U.S. Cl.
 CPC .............. *G01S 19/32* (2013.01); *G01S 19/44* (2013.01)

(58) Field of Classification Search
 USPC .................................................. 702/3
 See application file for complete search history.

(56) References Cited

U.S. PATENT DOCUMENTS

| | | | |
|---|---|---|---|
| 5,867,411 A | 2/1999 | Kumar | |
| 7,312,747 B2 | 12/2007 | Vollath et al. | |
| 7,432,853 B2 | 10/2008 | Vollath | |
| 7,498,979 B2 | 3/2009 | Liu et al. | |
| 7,538,721 B2 | 5/2009 | Vollath et al. | |
| 7,541,975 B2 | 6/2009 | Sever et al. | |
| 7,589,668 B2 | 9/2009 | Vollath et al. | |
| 7,692,578 B2 | 4/2010 | Vollath et al. | |
| 7,746,272 B2 | 6/2010 | Vollath | |
| 7,755,542 B2 * | 7/2010 | Chen et al. ............... 342/357.24 |
| 7,868,820 B2 | 1/2011 | Kolb | |
| 7,982,667 B2 | 7/2011 | Vollath et al. | |
| 8,018,377 B2 | 9/2011 | Collins | |
| 8,130,143 B2 | 3/2012 | Liu et al. | |
| 8,237,609 B2 | 8/2012 | Talbot et al. | |
| 8,368,590 B2 | 2/2013 | Vollath et al. | |

(Continued)

FOREIGN PATENT DOCUMENTS

| | | |
|---|---|---|
| JP | 2003-43128 A | 2/2003 |
| WO | 2012/128979 A2 | 9/2012 |

(Continued)

OTHER PUBLICATIONS

G Sasibhushana Rao, GPS satellite and receiver instrumental biases estimation using least squares method for accurate ionosphere modeling, J. Earth Syst. Sci. 116, No. 5, Oct. 2007, pp. 407-411 © Printed in India, pp. 407-411*

(Continued)

*Primary Examiner* — Tung S Lau

(74) *Attorney, Agent, or Firm* — Kilpatrick Townsend & Stockton LLP

(57) ABSTRACT

Methods and apparatus are presented for estimating environmental parameters from GNSS signals in real time. Some embodiments estimate a float solution using a federated ionospheric filter. Some embodiments fix ambiguities for improved estimates.

27 Claims, 19 Drawing Sheets

(56) References Cited

U.S. PATENT DOCUMENTS

| | | | |
|---|---|---|---|
| 8,368,591 | B2 | 2/2013 | Talbot et al. |
| 8,400,351 | B2 | 3/2013 | Talbot et al. |
| 2009/0184869 | A1 | 7/2009 | Talbot et al. |
| 2010/0141515 | A1 | 6/2010 | Doucet et al. |
| 2010/0253575 | A1 | 10/2010 | Vollath |
| 2011/0140959 | A1 | 6/2011 | Vollath |
| 2011/0148698 | A1 | 6/2011 | Vollath |
| 2011/0156949 | A1 | 6/2011 | Vollath et al. |
| 2011/0187590 | A1 | 8/2011 | Leandro |
| 2011/0267228 | A1 | 11/2011 | Talbot et al. |
| 2011/0279314 | A1 | 11/2011 | Talbot et al. |
| 2011/0285587 | A1 | 11/2011 | Vollath et al. |
| 2012/0026038 | A1 | 2/2012 | Vollath |
| 2012/0092213 | A1 | 4/2012 | Chen |
| 2012/0119944 | A1* | 5/2012 | Chen .................. 342/26 A |
| 2012/0154210 | A1 | 6/2012 | Landau et al. |
| 2012/0154214 | A1 | 6/2012 | Leandro |
| 2012/0154215 | A1 | 6/2012 | Vollath et al. |
| 2012/0162007 | A1 | 6/2012 | Leandro et al. |
| 2012/0163419 | A1 | 6/2012 | Seeger |
| 2012/0229332 | A1 | 9/2012 | Vollath et al. |
| 2012/0286991 | A1 | 11/2012 | Chen et al. |
| 2012/0293367 | A1* | 11/2012 | Chen et al. ............. 342/357.68 |
| 2012/0306694 | A1* | 12/2012 | Chen et al. ............. 342/357.44 |
| 2013/0044026 | A1* | 2/2013 | Chen et al. ............. 342/357.27 |

FOREIGN PATENT DOCUMENTS

| | | |
|---|---|---|
| WO | 2012/128980 A1 | 9/2012 |
| WO | 2012/151006 A1 | 11/2012 |

OTHER PUBLICATIONS

Reima Eresmaa, Ground-based GNSS receivers as a meteorological observing system, 7 pages, printed Feb. 6, 2014.*

Variable: Ionospheric Total Electron Content, p. 1, printed Feb. 6, 2014, http://www.wmo-sat.info/oscar/variables/view/91.*

J. Davis et al., "Geodesy by radio interferometry: Effects of atmospheric modeling errors on estimates of baseline length," Radio Science, vol. 20, No. 6, 1985, pp. 1593-1607.

A. Basili et al., "A ground-based microwave radiometer and a GPS network for the remote sensing of atmospheric water vapour content: a year of experimental results," 1st COST720 Workshop: Integrated groundbased remote sensing stations for atmospheric profiling, I'Aquila, Italy, Jun. 2002, 6 pages.

Bernese GPS Software Version 5.0 User Manual, R. Dach et al. Eds., Jan. 2007, 640 pp.

G. Bierman et al., Factorization Methods for Discrete Sequential Estimation, Academic Press Inc., 1977, ISBN 0-120097350-2, 129 pp.

D. Bilitza, "International Reference Ionosphere 2000," Radio Science, vol. 36, No. 2, pp. 261-275, Mar./Apr. 2001, pp. 261-275.

J. Boehm, "Global Mapping Function (GMF): A new empirical mapping function based on numerical weather model data," Geophysical Research Letters, vol. 33, Issue 7, Apr. 2006, 4 pp.

J. Boehm, "subroutine gpt: this subroutine determines Global Pressure and Temperature based on Spherical Harmonics up to degree and order 9," IGSMAIL-5618: revision of IERS Conventions Chapter 9, Jul. 2007, 6 pp.

J. Boehm et al., "Short Note: A global model of pressure and temperature for geodetic applications," Journal of Geodesy, vol. 81, No. 10, Oct. 2007, 12 pp.

O. Colombo, "Resolving Carrier-Phase Ambiguities on the Fly, At More Than 100 km From Nearest Reference Site, With the Help of Ionospheric Tomography," ION GPS '99, Sep. 14-17, 1999, Nashville, TN, pp. 1635-1642.

J. Davis et al., "Geodesy by radio interferometry: Effects of atmospheric modeling errors on estimates of baseline length," Radio Science, vol. 20, No. 6, 1985, pp. 1593-1607 (Abstract only, 1 page).

E-GVAP: The EUMETNET EIG GNSS water vapour programme (description of E-GVAP set up in Apr. 2005), home page at http://egvap.dmi.dk/home_main.html, accessed Jun. 28, 2013, 2 pp.

Introduction to GAMIT/GLOBK, Release 10.35, Jun. 3, 2009, 45 pp.

GAMIT Reference Manual: GPS Analysis at MIT, Release 10.3, Jun. 1, 2009, 183 pp.

GLOBK Reference Manual: Global Kalman filter VLBI and GPS analysis program, Release 10.3, May 28, 2009, 95 pp.

B. Hofmann-Wellenhof et al., Global Positioning System Theory and Practice, Second edition, 1993, pp. 98-106.

P. Kolb, "A New Method to Model the Ionosphere Across Local Area Networks," ION GNSS 18th International Technical meeting of the Satellite Division, Sep. 13-16, 2005, Long Beach, CA, pp. 705-711.

S. Kumar et al., "Annual variability of water vapor from GPS and MODIS data over the Indo-Gangetic Plains," J. Ind. Geophys. Union, Jan. 2009, vol. 13, No. 1, pp. 17-23.

D. McCarthy et al., IERS Conventions (2003), IERS Technical Note No. 32, 2004, 127 pp.

V. Mendes, Modeling the Neutral-Atmosphereic Propagation Delay in Radiometric Space Techniques, Ph.D. dissertation, Department of Geodesy and Geomatics Engineering Technical Report No. 199, University of New Brunswick, Fredericton, New Brunswick, Canada, Sep. 1998, 353 pp.

RTNet Atmospheric Processing & Products, GPS Solutions, Inc., Boulder, CO, Nov. 2011, brochure 2 pp.

SuomiNet Support: SuomiNet Deployment and Equipment Information, home page at http://suominet.ucar.edu/support/ accessed Apr. 10, 2010, 2 pp.

P. Teunissen et al., "GNSS Carrier Phase Ambiguity Resolution: Challenges and Open Problems," in M.G. Sideris (ed.) Observing our Changing Earth, International Assocation of Geodesy Symposia 133, 2009, pp. 785-792.

S. Verhagen, The GNSS integer ambiguities: estimation and validation, Delft Institute of Earth Observation and Space Systems, Delft University of Technology, 2004, 196 pp.

Virendrasingh et al., "Nowcasting of Thunderstorm using Integrated Precipitable Water Vapor Contents," verbal presentation at 2009 EUMETSAT Meteorological Conference, Bath, United Kingdom, Sep. 21-25, 2009, 28 pp.

A. Leick, GPS Satellite Surveying, Third Edition, 2004, pp. 188-201.

Arikan F. et al., "Estimation of single station interfrequency receiver bias using GPS-TEC" Radio Science, vol. 43 RS4004, (2008) 13 pages.

Duan et al., "GPS Meteorology: Direct Estimation of the Absolute Value of Precipitable Water" Journal of Applied Meteorology, vol. 35 (1996) 9 pages.

* cited by examiner

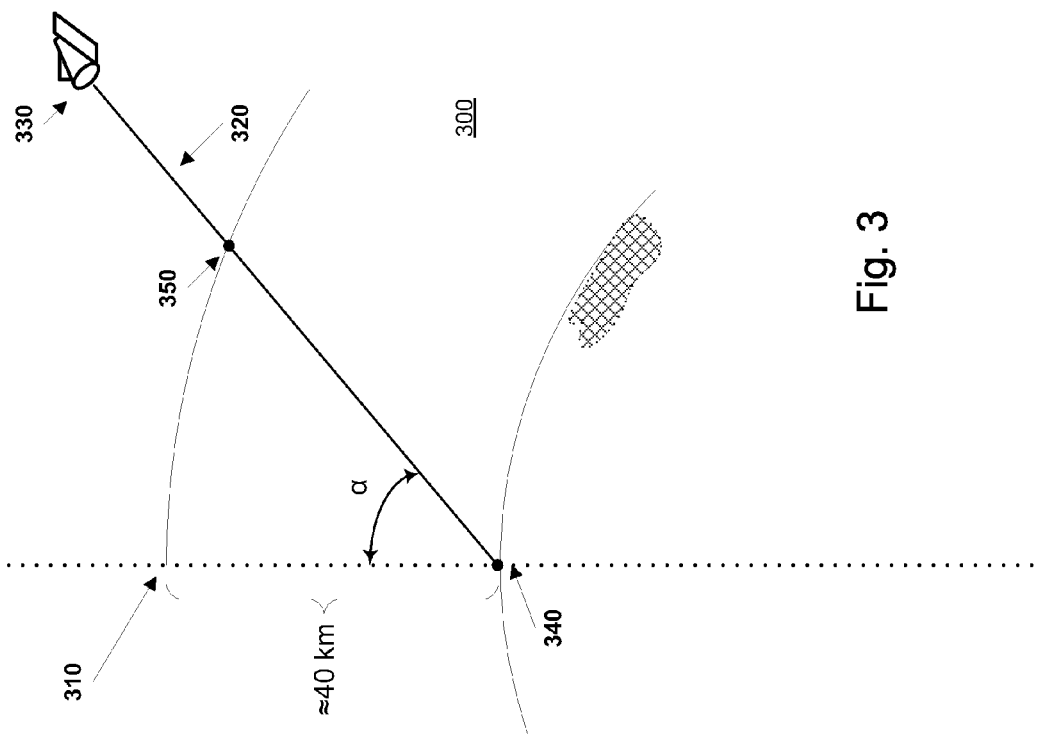

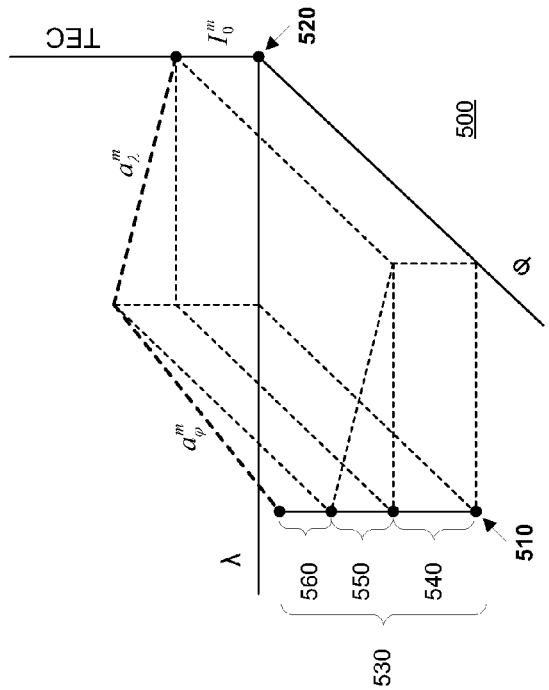
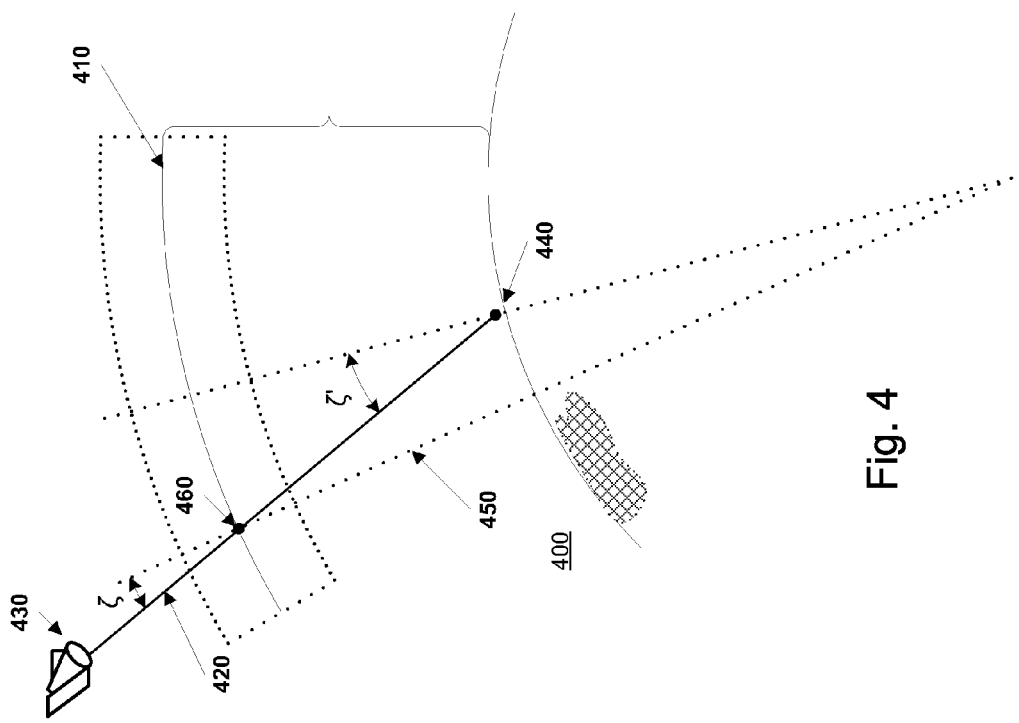
Fig. 5
Fig. 4

GNSS ATMOSPHERIC ESTIMATION WITH FEDERATED IONOSPHERIC FILTER

CROSS REFERENCE TO RELATED APPLICATIONS

The following are related hereto and incorporated herein in their entirety by this reference: International Patent Publication WO 2010/021656 A2 dated 25 Feb. 2010 (TNL A-2526PCT); International Patent Publication WO 2010/021658 A2 dated 25 Feb. 2010 (TNL A-2525PCT); International Patent Publication WO 2010/021659 A2 dated 25 Feb. 2010 (TNL A-2524PCT); International Patent Publication WO 2010/021657 A2 dated 25 Feb. 2010 (TNL A-2523PCT); International Patent Publication WO 2010/021660 A2 dated 25 Feb. 2010 (TNL A-2339PCT); U.S. Provisional Application for Patent No. 61/189,382 filed 19 Aug. 2008 (TNL A-2339P); U.S. patent application Ser. No. 12/224,451 filed 26 Aug. 2008, United States Patent Application Publication US 2009/0027625 A1 (TNL A-1789US); International Patent Application PCT/US07/05874 filed 7 Mar. 2007, International Publication No. WO 2008/008099 A2 (TNL A-1789PCT); United States Patent Application Publication US 2009/0224969 A1 (TNL A-1743US); International Publication No. WO 2007/032947 A1 (TNL A-1743PCT); U.S. Pat. No. 7,432,853 granted 7 Oct. 2008; (TNL A-1403US); International Publication Number WO 2005/045463 A1 (TNL A-1403PCT); International Publication Number WO 2011/034616 A2 (TNL A-2585PCT); International Patent Application Number PCT/US2011/024733 (TNL A-2633PCT); Provisional Application for U.S. Patent 61/337,980 filed 14 Feb. 2010 (TNL A-2633P); and Provisional Application for U.S. Patent 61/396,676 filed 30 May 2010 (TNL A-2751P).

TECHNICAL FIELD

The present invention relates to the field of Global Navigation Satellite Systems GNSS). More particularly, the present invention relates to methods and apparatus for processing of GNSS data to estimate environmental parameters.

BACKGROUND ART

Over the last two decades, a large number of regional GNSS reference station networks with several thousands of receivers have been established and provide network corrections for continuous real-time centimeter level positioning (also called Real-Time Kinematic positioning or RTK positioning). The principle of network RTK positioning is that tropospheric and ionospheric effects are modeled in the regional network and largely removed for the RTK positioning. For GNSS positioning, the atmospheric effects are considered as systematic error to be removed in the positioning process. On the other hand, the tropospheric and ionospheric delays estimated in the GNSS network are valuable for meteorological and space weather applications.

Numerous studies have shown that the Integrated Precipitable Water Vapour (IPWV) contained in the neutral atmosphere can be retrieved using GNSS observations with the same level of accuracy as Water Vapor Radiometers (WVR). The advantage of using a GNSS network is that it provides continuous IPWV estimation with good spatial coverage and high temporal resolution. Nowadays, several research organizations provide near real-time and/or post-processed IPWV estimation from a GNSS reference station network with a typical delay of 30 minutes up to a day, and an accuracy of 1~2 mm. Though the accuracy is quite good, the large latency means the information only reflects what happened in the past and is thus less useful for applications like Numerical Weather Prediction (NWP).

Space weather is the study of the environmental dynamics of "geospace": the region above the Earth's lower atmosphere including the ionosphere and the magnetosphere. Conditions on the Sun and in the solar wind, magnetosphere, and the ionosphere can affect our lives through the effects they have on satellites, communications, navigation, and power systems. Scientists are now studying space weather with a wide range of tools to try to learn more about the physical and chemical processes taking place in the upper atmosphere and beyond. In recent years, GNSS has become recognized as one of the premier remote sensing tools to monitor space weather events. The signals from the GNSS satellites travel through the ionosphere on their way to receivers on or near Earth's surface. The free electrons populating this region of the atmosphere affect the propagation of the signals, changing their speed and direction of travel. By processing the data from a dual-frequency GNSS receiver, it is actually possible to estimate just how many electrons were encountered by the signal along its travel path—the total electron content (TEC). TEC is the number of electrons in a column with a cross-sectional area of one square meter centered on the signal path. If a regional network of ground-based GNSS receivers is used, then a map of TEC above the region can be constructed.

Known software programs for estimating atmospheric models from GNSS signal data, though not in real time, include the Bernese Software from the Astronomical Institute, University of Bern, Version 5.0, January 2007, Chapters 11 and 12, and the GAMIT/GLOBK software from the Department of Earth, Atmospheric and Planetary Sciences, Massachusetts Institute of Technology, GAMIT Reference Manual Release 10.3, 1 Jun. 2009, Chapter 7.

United States Patent Publication 2009/0224969 A1 of Peter F. Kolb describes a Kalman-filtering method to model the ionospheric effect with carrier phase data from a regional network in real time. As only the carrier phase data is used, the absolute level of the TEC needs a long time to converge.

Improved methods and apparatus for estimation of atmospheric parameters from GNSS data in real time are desired.

SUMMARY

Some embodiments of the invention use pseudorange and carrier phase observations in a federated filter approach to accelerate the convergence of TEC for real-time estimation.

Some embodiments of the invention exploit the full accuracy of carrier phase observations using carrier phase ambiguities to achieve high accuracy TEC estimation in real time.

Some embodiments provide a method of processing GNSS signal data to estimate environmental parameter values, comprising: obtaining GNSS data collected at a plurality of stations distributed over a region from signals received from GNSS satellites over multiple epochs; obtaining a satellite differential code bias (DCB) per satellite, and estimating a receiver differential code bias per station and a value of total electron content (TEC) per station per satellite from the GNSS data and the satellite differential code biases using a federated ionospheric filter.

Some embodiments further apply a geometric filter to estimate from the GNSS data a set of values for atmospheric parameters comprising at least one of (i) a zenith total delay per station, (ii) a zenith total delay per station and a set of tropospheric gradients per station, and (ii) a slant total delay per station per satellite; obtain meteorological data for locations within the region; and determine values over the region for at least one of (1) integrated precipitable water vapor (IPWV) and (2) tropospheric slant wet delay, from the set of values for atmospheric parameters and the meteorological data.

In some embodiments, obtaining a satellite differential code bias per satellite comprises one of (i) retrieving a satellite differential code bias per satellite from an external source, and (ii) computing a satellite differential code bias per satellite from GNSS data collected at a network of reference stations. In some embodiments, estimating a value of total electron content per station per satellite comprises: estimating values for ionospheric model parameters and for a stochastic ionospheric delay term per satellite per station in the federated ionospheric filter, and determining the value of total electron content per station per satellite from the estimated values for the ionospheric model parameters and the stochastic ionospheric delay terms.

In some embodiments, applying a federated ionospheric filter comprises: for each satellite, applying to the GNSS signal data an ionospheric subfilter to estimate values for local states representing parameters unique to that satellite and values for common states representing parameters common to all receivers, providing values for the common states and associated statistical information to a master filter; and preparing updated estimates for the local states when updated values for the common states are provided by the master filter; and applying to the values for the common states and the associated statistical information a master filter to estimate updated values for the common states, and to provide the updated values to the ionospheric subfilters.

In some embodiments, the states unique to the satellite comprise: a set of parameters characterizing ionosphere across the region, a stochastic ionospheric delay term per station per satellite, and an integer ambiguity per station per satellite. In some embodiments, the states common to all satellites comprise a receiver differential code bias per station. Some embodiments further comprise resetting states in the master filter to zero with infinite variance before any observation update at each epoch, and then applying the decorrelated observations from each subfilter to the master filter. In some embodiments, the value of total electron content per station per satellite comprises a value mapped to vertical. In some embodiments, obtaining meteorological data comprises obtaining surface meteorological data for locations within the region. In some embodiments, obtaining meteorological data comprises obtaining radiosonde temperature data for locations within the region. In some embodiments, elapsed time between obtaining the GNSS data and determining values over the region for total electron content and at least one of integrated precipitable water vapor and tropospheric slant wet delay is no more than about five seconds.

Some embodiments provide apparatus for processing GNSS signal data to estimate environmental parameter values, comprising: a federated ionospheric filter adapted to estimate a receiver differential code bias per station and a value of total electron content (TEC) per station per satellite from satellite differential code biases and the GNSS signal data.

Some embodiments further provide: a geometric filter adapted to estimate from the GNSS data a set of values for atmospheric parameters comprising at least one of: (i) a zenith total delay per station, (ii) a zenith total delay per station and a tropospheric gradient per station, and (iii) a slant total delay per station per satellite; an atmospheric watch module to determine values over the region for integrated precipitable water vapor and tropospheric slant wet delay, from the estimated values for the atmospheric parameters and from the meteorological data for the region.

Some embodiments further comprise an element to obtain a code bias per satellite by one of: retrieving a code bias per satellite from an external source, and computing a code bias per satellite from GNSS data collected at a network of GNSS reference stations. Some embodiments further comprise: a module to estimate values for ionospheric model parameters and for a stochastic ionospheric delay term per satellite per station; and a module to determine the value of total electron content per station per satellite from the estimated values for the ionospheric model parameters and the stochastic ionospheric delay terms.

In some embodiments, the federated ionospheric filter comprises: an ionospheric subfilter for each satellite, to estimate values for local states representing parameters unique to that satellite and values for common states representing parameters common to all receivers, from the GNSS signal data and a satellite differential code bias, to provide values for the common states and associated statistical information to master filter; and to prepare updated estimates for the local states when updated values for the common states are provided by the master filter; and a master filter to estimate updated values for the common states from the values for the common states and the associated statistical information, and to provide the updated values to the ionospheric subfilters.

In some embodiments, the federated ionospheric filter is operative to reset states in the master filter to zero with infinite variance before observation update at each epoch, and then to apply the decorrelated observations from each subfilter to the master filter. In some embodiments, the meteorological watch module is adapted to use surface meteorological data for locations within the region as at least a subset of the meteorological data. In some embodiments, the meteorological watch module is adapted to radiosonde sounding data as at least a subset of the meteorological data.

Some embodiments provide a method of processing GNSS signal data to estimate environmental parameter values, comprising: obtaining GNSS data collected at a plurality of stations distributed over a region from signals received from GNSS satellites over multiple epochs; obtaining a satellite code bias per satellite; estimating from the GNSS data and the satellite code biases a set of float ambiguities per station per satellite and values for atmospheric parameters comprising at least one of: (i) a total electron content per station per satellite, (ii) a zenith total delay per station, (iii) a zenith total delay per station and a set of tropospheric gradients per station, and (iv) a slant total delay per station per satellite; fixing the ambiguities; and estimating from the GNSS data and the fixed ambiguities corrected values for the atmospheric parameters.

Some embodiments further comprise obtaining meteorological data for locations within the region; and determining values over the region for at least one of integrated precipitable water vapor and tropospheric slant wet delay, from the corrected values for the atmospheric parameters and from the meteorological data.

In some embodiments, estimating the values for atmospheric parameters comprises applying at least one iterative filter to the GNSS data and the satellite code biases. In some embodiments, estimating the values for atmospheric parameters comprises applying a set of factorized filters to the GNSS data and the satellite code biases. In some embodiments, estimating the values for atmospheric parameters comprises applying a federated ionospheric filter to the GNSS data and the satellite code biases. In some embodiments, the value of total electron content per station per satellite comprises a value mapped to vertical. In some embodiments, obtaining meteorological data comprises obtaining surface meteorological data for locations within the region. In some embodiments, obtaining meteorological data comprises obtaining radiosonde temperature data for locations within the region. In some embodiments, the elapsed time between obtaining the GNSS data and determining values over the region for the atmospheric parameters is no more than about 5 seconds.

Some embodiments provide apparatus for processing GNSS signal data to estimate environmental parameter values, comprising: at least one recursive filter to estimate from satellite differential code biases and from the GNSS signal data a set of float ambiguities per station per satellite and a set of values for atmospheric parameters comprising at least one of: (i) a total electron content per station per satellite, (ii) a zenith total delay per station, (iii) a zenith total delay per station and a set of tropospheric gradients per station, (iv) a slant tropospheric total delay per station per satellite, and (v) a total electron content per station per satellite; an ambiguity-fixing module to prepare fixed ambiguities from the float ambiguities; and a corrector module to prepare from the GNSS data and the fixed ambiguities corrected values for the atmospheric parameters.

Some embodiments further provide a meteorological watch module to determine values for at least one of integrated precipitable water vapor and tropospheric slant wet delay from the corrected values for the atmospheric parameters.

In some embodiments, the at least one recursive filter comprises a Kalman filter. In some embodiments, the at least one recursive filter comprises a set of factorized filters. In some embodiments, the at least one recursive filter comprises a federated ionospheric filter. In some embodiments, the value of total electron content per station per satellite comprises a value mapped to vertical. In some embodiments, the meteorological watch module is operative to process meteorological data comprising surface meteorological data for locations within the region. In some embodiments, the meteorological watch module is operative to process meteorological data comprising radiosonde sounding data for locations within the region. In some embodiments, the elapsed time between obtaining the GNSS data and determining values over the region for integrated precipitable water vapor and ionospheric slant wet delay is no more than about 5 seconds.

Some embodiments provide a computer program product comprising: a computer usable medium having computer readable instructions physically embodied therein, the computer readable instructions when executed by a processor enabling the processor to perform a method as described herein. Some embodiments provide a computer program comprising a set of instructions which when loaded in and executed by a processor enable the processor to perform a method as described herein.

BRIEF DESCRIPTION OF DRAWING FIGURES

These and other aspects and features of the present invention will be more readily understood from the embodiments described below with reference to the drawings, in which:

FIG. 1 schematically illustrates a prior-art GNSS scenario;

FIG. 2 schematically illustrates the influence of ionosphere and tropospheric on signal of a GNSS network;

FIG. 3 schematically illustrates the slant path of a GNSS signal through the troposphere from satellite to receiver;

FIG. 4 schematically illustrates the slant path of a GNSS signal through the ionosphere satellite to receiver;

FIG. 5 illustrates how ionospheric parameters describe the ionosphere at a piercepoint relative to a reference point;

FIG. 6 schematically illustrates a GNSS network useful in implementing some embodiments of the invention;

FIG. 7 is a flow chart of a real-time process for estimating atmospheric parameter values, using a federated ionospheric filtering method in accordance with some embodiments of the invention;

FIG. 8 schematically illustrates a system using a federated ionospheric filter in accordance with some embodiments of the invention;

DETAILED DESCRIPTION

Part 1: Introduction

Figure 1:
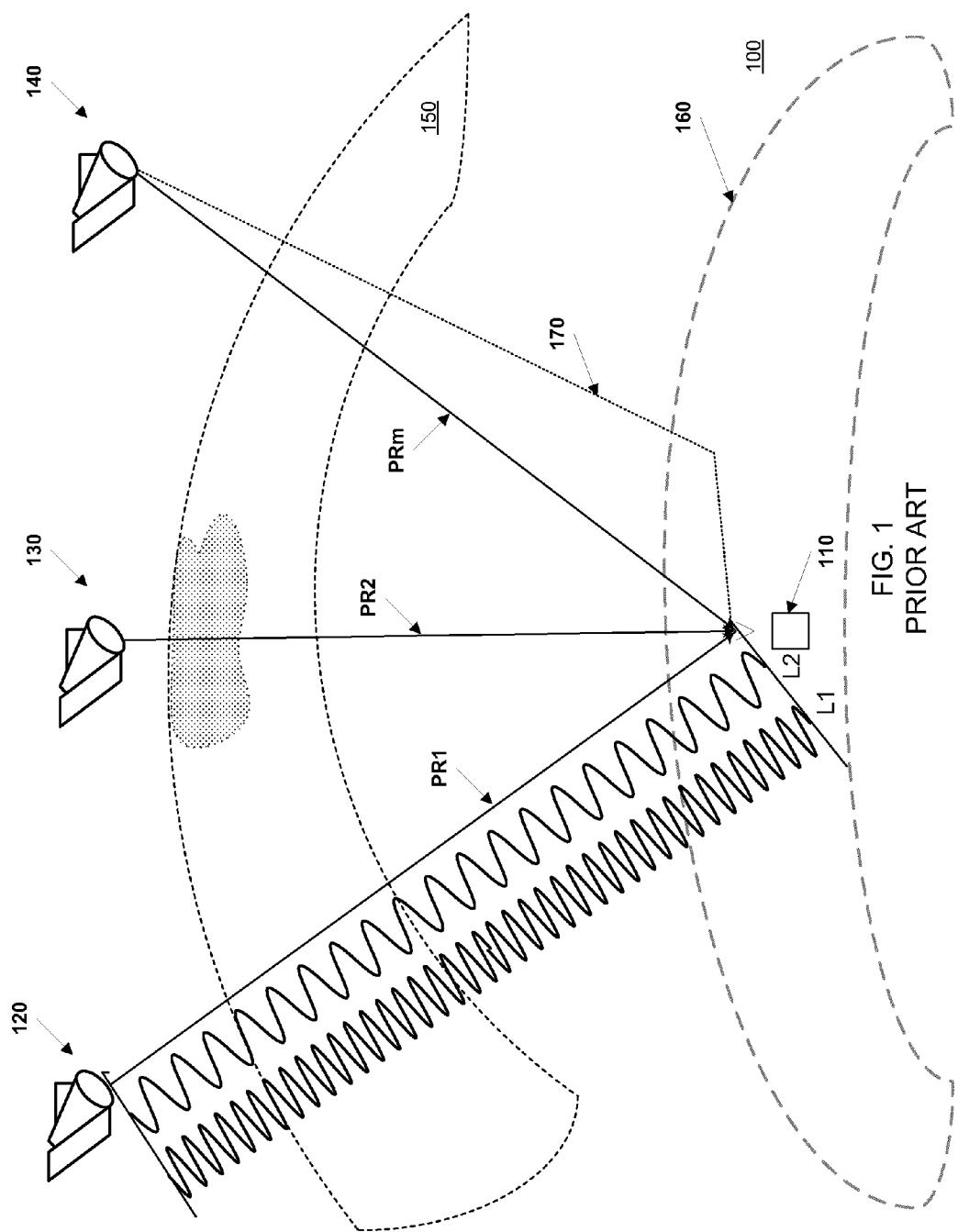

FIG. 1 schematically illustrates a prior-art GNSS scenario 100. Receiver 110 receives GNSS signals from any number m of satellites in view, such as at 120, 130 and 140. The signals pass through the earth's ionosphere 150 and through the earth's troposphere 160. Each signal has multiple carrier frequencies, such as frequencies L1 and L2. Receiver 110 determines from the signals respective pseudo-ranges, PR1, PR2, ..., PRM, to the satellites. Pseudo-range determinations are distorted by signal-path variations resulting from passage of the signals through the ionosphere 150 and the troposphere 160, and from multipath effects, as indicated schematically at 170. Pseudo-ranges can be determined using the C/A code with an error of about one meter. However, the phases of the L1 and L2 carriers can be measured with an accuracy of 0.01-0.05 cycles (corresponding to pseudo-range errors of 2 mm to 1 cm). Phase measurements of the carriers are influenced by the dispersive effects of the ionosphere, which vary over time.

Figure 2:
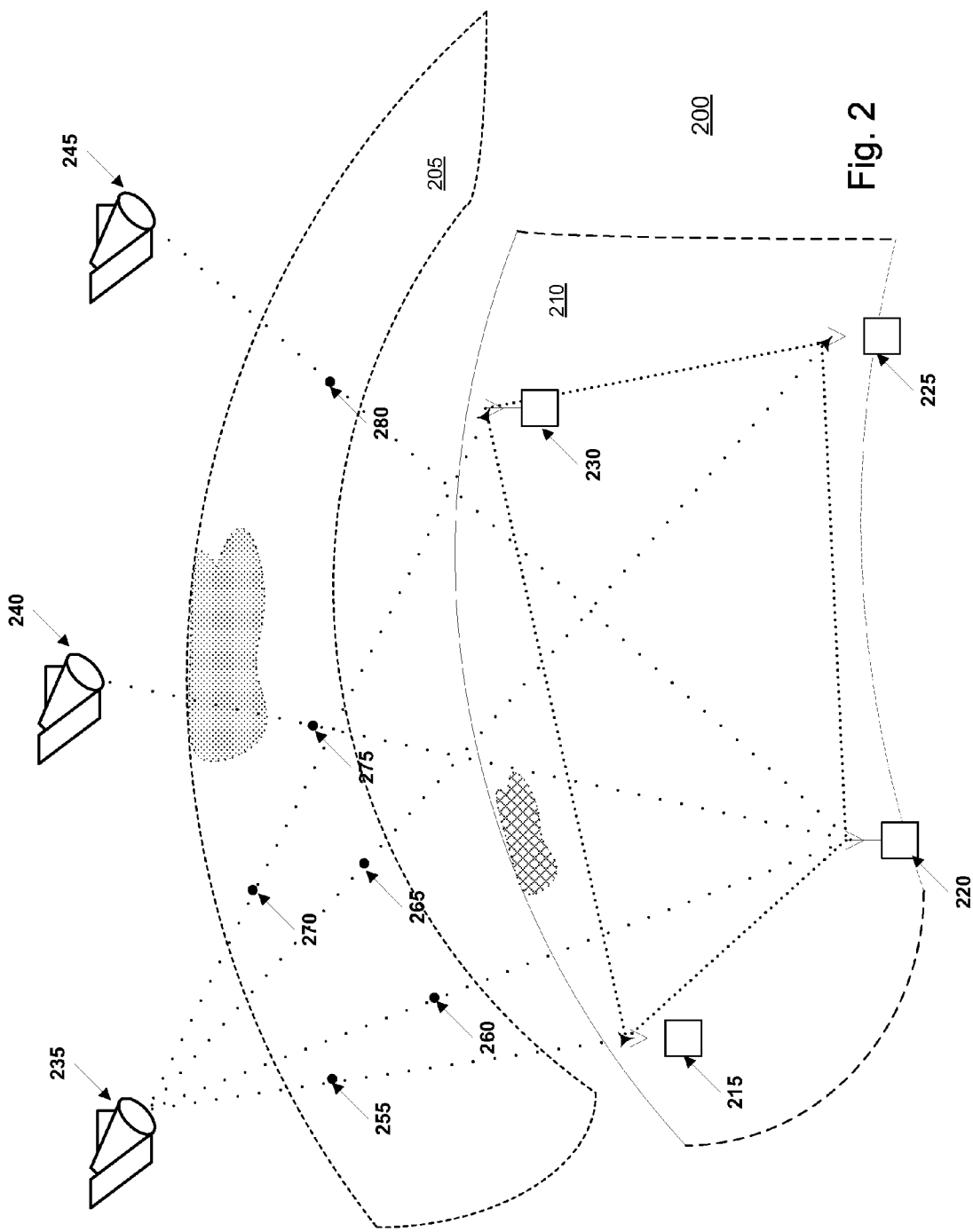

FIG. 2 schematically illustrates at 200 an ionospheric shell 205 and a portion 210 of a tropospheric shell surrounding the Earth, with ground-based reference stations 215, 220, 225, ... 230 of a network each receiving signals from GNSS satellites 235, 240, ... 245. The troposphere has a depth of, for example zero to about 11 km. Tropospheric delay affects the signals received by each reference station in a manner depending on atmospheric temperature, pressure and humidity in the vicinity of the reference station, as well as the elevation of the satellite relative to the reference station. The error is about 1 mm per meter at ground level, such that the last meter of the signal path to the reference station gives about 1 mm of error in the tropospheric model.

Various techniques are known for modeling tropospheric path delay on the signals. See, for example, B. HOFMANN-WELLENHOF et al., GLOBAL POSITIONING SYSTEM: THEORY AND PRACTICE, 2d Ed., 1993, section 6.3.3, pp. 98-106. Tropospheric scaling (tropo-scaling) which lumps the atmospheric parameters into one tropo-scaling parameter can be implemented in at least three ways. A first approach is to model Zenith Total Delay (ZTD) representing tropospheric delay in a vertical direction relative to the reference station as a value representing range error δr, e.g., 2.58 meters. A second approach is to model the sum of one plus a scaling factor (1+S) such that tropospheric delay in the vertical direction T'=(1+S) T, where T is a constant, e.g., 1+S=1.0238. Another approach is to model S directly, e.g., S=2.38%. In general, "tropospheric effect" is all that affects different signal frequencies in the same way (non-dispersive).

As shown in FIG. 3, except when a satellite is directly over a reference station, signal rays penetrate the troposphere 310 in a slant path from satellite to receiver such as path 320 from satellite 330 to reference station 340. The slant path of the signal ray from a given satellite to each reference station penetrates the troposphere at an angle α which is different for each satellite in view at the station. The tropospheric mapping function is thus different for each satellite-to-reference-station combination at each epoch. The effect of the different slant angles can be compensated by relating the geometry-dependent zenith tropospheric delay Tα with a geometry-independent tropospheric delay $T_{90}°$ (Vertical T) by a mapping function m(α): Tα=m(α) $T_{90}°$.

As shown in FIG. 4, signal rays similarly penetrate the ionosphere 410 in a path from satellite to receiver such as path 420 from satellite 430 to reference station 440. This slant path is explicitly accounted for by the so-called mapping function $$f_{mapping}(\zeta) = 1/\cos(\zeta), \quad (1)$$

where ζ is the angle of the signal ray with the line 450 perpendicular to the ionospheric sphere through the piercepoint 460 (e.g., line 1410). The slant path of the signal ray from a given satellite to each reference station penetrates the ionosphere at a different angle and is different for each reference station. The mapping function is thus different for each satellite-to-reference-station combination. The effect of the different slant angles can be compensated by relating the geometry-dependent Total Electron Content (TEC) with a geometry-independent VTEC (Vertical TEC) such that $$TEC/f_{mapping}(\zeta) = TEC \cos(\zeta) = VTEC. \quad (2)$$

In the example of FIG. 4, the TEC determined along slant path 460 corresponds to the VTEC along the line 450 perpendicular to the ionospheric sphere 410 at piercepoint 460.

With the concept of the mapping function, the ionospheric advance across the network area can be written as (here the uppercase i and j are to be understood as exponents, not indices)

$$I(\Delta\lambda, \Delta\varphi) = m(\Delta\lambda, \Delta\varphi)\left(\sum_{i,j=0}^{\infty} \alpha_{i,j}\Delta\lambda^i \Delta\varphi^j\right). \quad (3)$$

That is, the ionospheric advance across the network area is expressed in terms of its Taylor series (or any other set of orthogonal functions, such as spherical Bessel functions). For most purposes, and as illustrated here, the expansion can be stopped at first order, and the terminology $a_{1,0}=a_\lambda$ and $a_{0,1}=a_\varphi$ introduced. The expression $a_{0,0}=I_0$ is the ionospheric advance at the reference point, while $a_\lambda$ and $a_\varphi$ are the gradients in the ionosphere in the relative coordinates. The ionosphere at the piercepoints is therefore expressed as $$I_n^m = m_n^m(I_0^m + a_\lambda^m \Delta\lambda_n^m + a_\varphi^m \Delta\varphi_n^m). \quad (4)$$

Thus for each satellite m in view the parameters ($I_0^m$, $a_\lambda^m$, $a_\varphi^m$) characterize the ionosphere across the network area. Those parameters are estimated, together with the carrier-phase integer ambiguity and multipath states. Generally, if the expansion of Eq. (3) is carried to k-th order, the number of states introduced for the ionosphere is (k+1)(k+2)/2. The other terms of Eq. (3) ($m_n^m$, $\Delta\lambda_n^m$, $\Delta\varphi_n^m$) are given by the geometry of the network and the position of satellite m.

FIG. 5 illustrates how the ionospheric parameters ($I_0^m$, $a_\lambda^m$, $a_\varphi^m$) a describe the ionosphere at a piercepoint 510 relative to a reference point 520. The ionosphere has a TEC of $I_0^m$ at the reference point, with a slope $a_\lambda^m$ in angular direction λ and a slope $a_\varphi^m$ in angular direction φ. In the example of FIG. 5, the TEC 530 at piercepoint 510 is the sum of a contribution 540 equal to $I_0^m$, a contribution 550 based on slope $a_\lambda^m$ and the angular distance of piercepoint 520 from reference point 520 in direction λ, and a contribution 560 based on slope $a_\varphi^m$ and the angular distance of piercepoint 510 from reference point 520 in direction φ.

While a linear treatment of the ionosphere delivers excellent availability, an even more realistic model takes into account the thickness of the ionosphere. As is known (for example from D. BILITZA, International Reference Ionosphere 2000, RADIO SCIENCE 2 (36) 2001, 261), the electron density of the ionosphere has a certain profile ƒ(h) as a function of altitude h which peaks sharply at a height between 300-400 kilometers above ground. The electron content that a ray experiences from satellite m to station n is expressed by the integral $$I_n^m \propto \int_{(x^m, y^m, z^m)}^{(x_n, y_n, z_n)} ds f(h), \quad (5)$$

where s is the measure along the direct line of sight between station and satellite. For a simple shell model, ƒ(h)=Δ(h−$h_0$) (Dirac Delta distribution), and this expression reduces to the previous mapping function as $$\left.\frac{ds}{ds}\right|_{h_0} = \frac{1}{\cos\varphi}. \quad (6)$$

Figure 8:
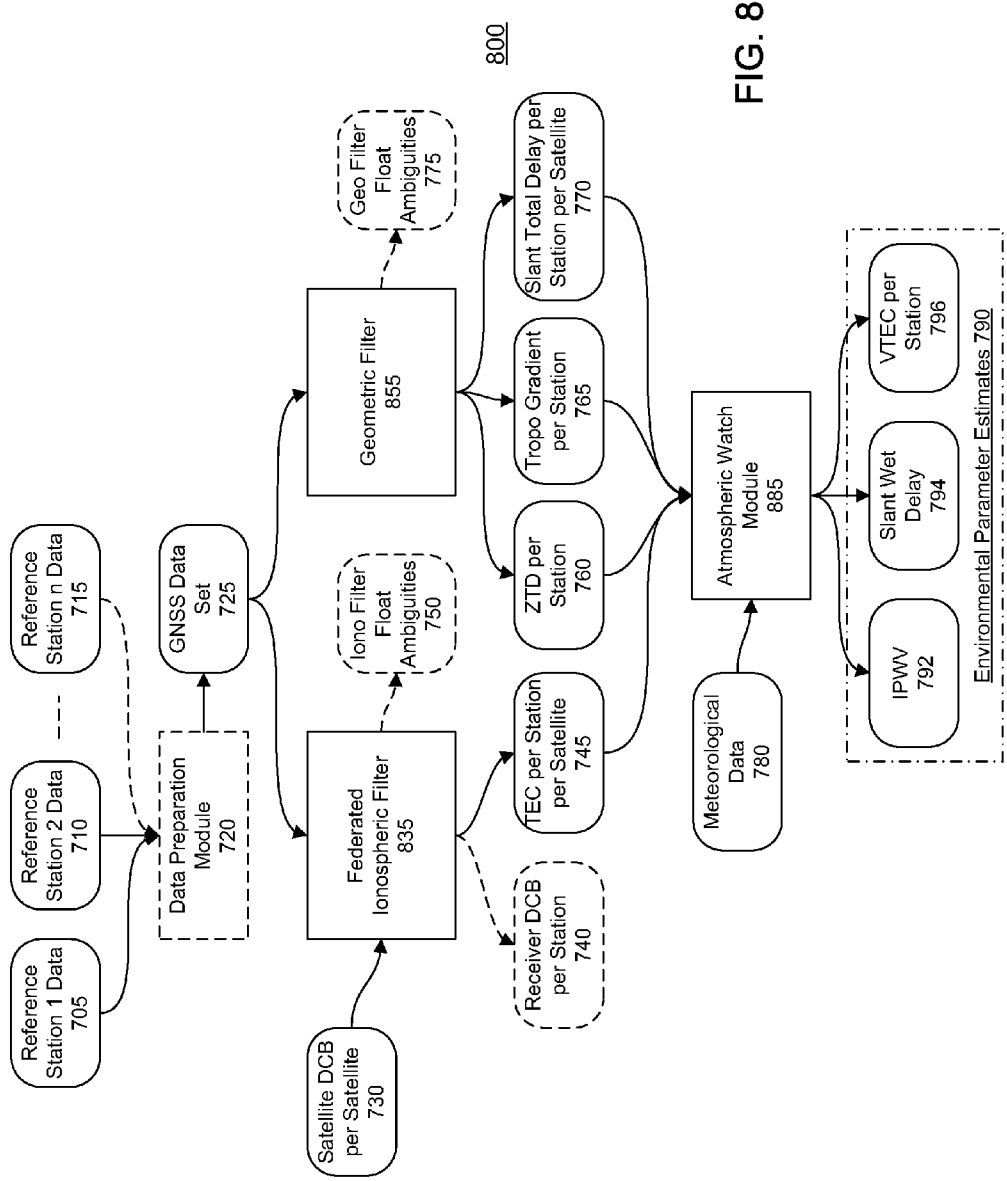

Using suitable parameters for ƒ(h), the integral for all station-satellite pairs can be numerically computed at each epoch. For practical purposes an approximation in terms of a box profile is sufficient and delivers improvements over the shell model. It is assumed that the gradients in the ionosphere do not depend on altitude. This assumption can easily be relaxed by adding further gradient states for different altitudes. That the finite thickness of the ionosphere is an important feature of the model can be understood by picturing the entry and exit point of the ray of a low elevation satellite, e.g., as shown in FIG. 8 of United States Patent Application Publication US 2009/0224969 A1. If the thickness of the ionospheric shell is 200 kilometers, the entry point and exit point might be separated by some 1000 kilometers. With typical gradients of $a_\lambda$, $a_\phi \sim 10^{-3}$ m/km, the contributions to the calculation of ionospheric advance differ greatly from entry point to exit point.

Figure 6:
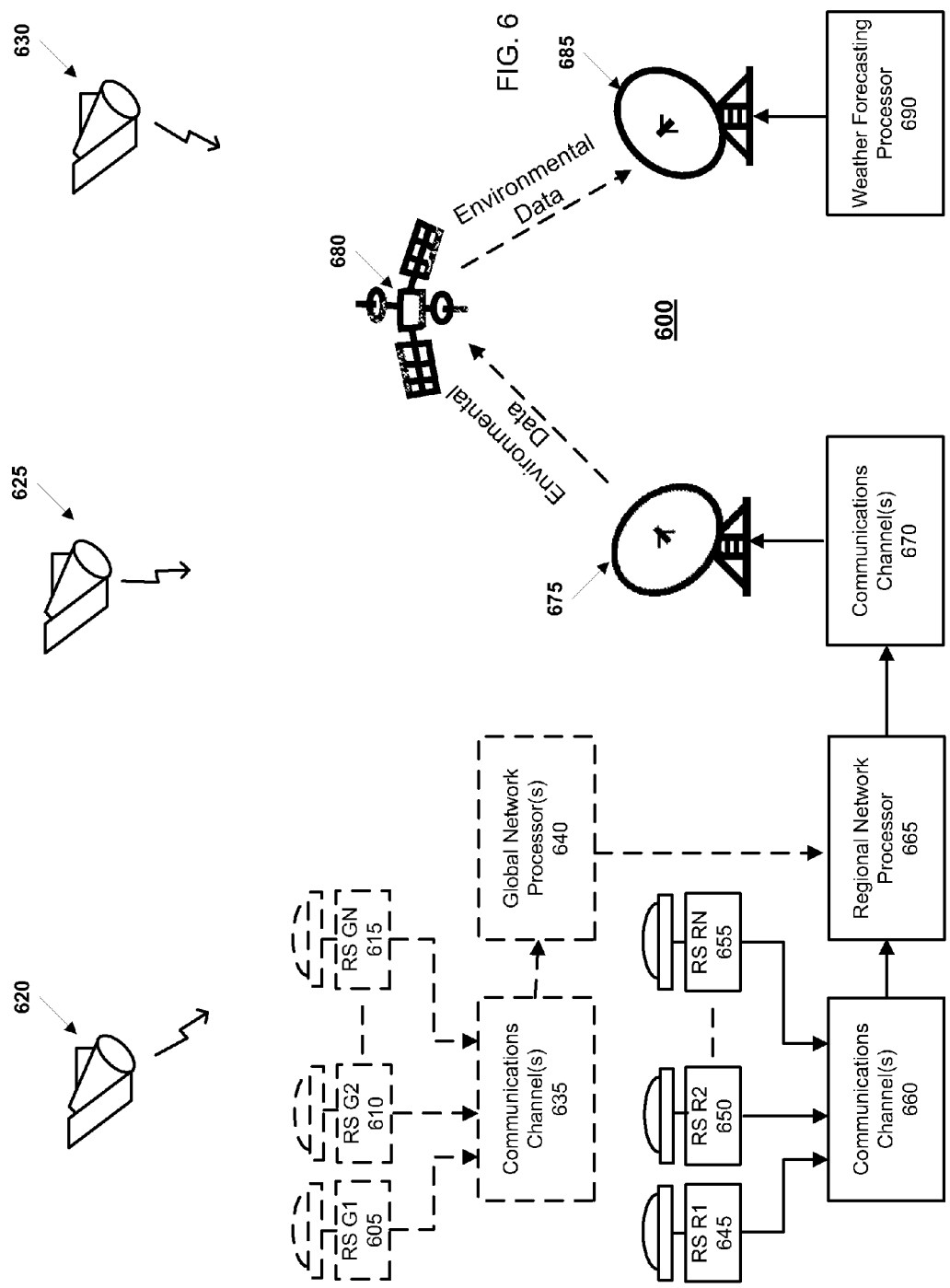

FIG. 6 schematically illustrates a system 600 useful in implementing some embodiments of the invention. Reference stations of an optional global (worldwide) tracking network, such as reference stations 605, 610, . . . 615, are distributed about the Earth with the aim of having substantially continuous observability of most or all GNSS satellites. The position of each reference station is known very precisely, e.g., within less than 2 cm. Each reference station is equipped with an antenna and tracks the GNSS signals transmitted by the satellites in view at that station, such as GNSS satellites 620, 625, . . . 630. The GNSS signals have codes modulated on each of two or more carrier frequencies. Each reference station of the global network acquires GNSS data representing, for each satellite in view at each epoch, carrier-phase (carrier) observations of at least two carriers, and pseudorange (code) observations of the respective codes modulated on at least two carriers. The reference stations also obtain the broadcast navigation message with almanac and ephemerides of the satellites from the satellite signals. The almanac contains the rough position of all satellites of the GNSS, while the so-called broadcast ephemerides provide more precise predictions (ca. 1 m) of the satellites' positions and the satellites' clock error (ca. 1.5 m) over specific time intervals.

GNSS data collected at the reference stations of the optional global network are transmitted via communications channels 635 to a global network processor 640. Global network processor 640 uses the GNSS data from the reference stations of the global network with other information to estimate parameters such as satellite differential code biases (DCBs) used in regional network processing. Such a global system is described in U.S. Provisional Application for Patent No. 61/277,184 filed 19 Sep. 2009 (TNL A-2585P).

Still referring to FIG. 6, reference stations of a regional (local) tracking network, such as reference stations 645, 650, . . . 655, are distributed over a region of the Earth so as to observe GNSS satellites visible over the region. The position of each reference station is known precisely, e.g., within less than 2 cm. Each reference station is equipped with an antenna and tracks the GNSS signals transmitted by the satellites in view at that station, such as GNS satellites 620, 625, . . . 630. Each reference station of the regional network acquires GNSS data representing, for each satellite in view at each epoch, carrier-phase (carrier) observations of at least two carriers, and pseudorange (code) observations of the respective codes modulated on at least two carriers. The regional reference stations typically also obtain the broadcast navigation message with almanac and ephemerides of the satellites from the satellite signals.

GNSS data collected at the reference stations of the regional network are transmitted via communications channels 660 to a regional network processor 665. Regional network processor 665 uses the GNSS data from the reference stations of the regional network with other information to estimate values of atmospheric parameters as described below. These values are made available for display and/or for use in one or more weather forecasting processors 670. The data are transmitted for example as shown in FIG. 6 via communications channels 675, an uplink 680, a communications satellite 685, and a downlink 690. Any other suitable transmission medium may be used including but not limited to interne, radio broadcast or mobile telephone link.

Part 2: Federated Ionospheric Filter

Some embodiments in accordance with the invention estimate environmental parameters using a federated ionospheric filter.

GPS $L_1$ and $L_2$ carrier phase and pseudorange observations can be expressed as:

$$L_1 = \lambda_1 \varphi_1 = \rho + T + I + c \cdot (t_r - t^s) + b_1^r - b_1^s + \lambda_1 N_1 + v_1 \quad (7)$$

$$L_2 = \lambda_2 \varphi_2 = \rho + T + \frac{\lambda_2^2}{\lambda_1^2} I + c \cdot (t_r - t^s) + b_2^r - b_2^s + \lambda_2 N_2 + v_2 \quad (8)$$

$$P_1 = \rho + T - I + c \cdot (t_r - t^s) + B_1^r - B_1^s + \varepsilon_1 \quad (9)$$

$$P_2 = \rho + T - \frac{\lambda_2^2}{\lambda_1^2} I + c \cdot (t_r - t^s) + B_2^r - B_2^s + \varepsilon_2 \quad (10)$$

where:

$L_1$ and $L_2$ are the $L_1$ and $L_2$ carrier phase observations in meters, $\phi_1$ and $\phi_2$ are the $L_1$ and $L_2$ carrier phase observations in cycles, $P_1$ and $P_2$ are the L1 and L2 pseudorange observations in meters, $\rho$ is the geometric range between satellite and receiver antenna phase center, T is the tropospheric delay in meters, I is the $L_1$ ionospheric delay in meters, $t^s$ and $t_r$ are the satellite and receiver clock error, $b_1^s$ and $b_2^s$ are the satellite $L_1$ and $L_2$ phase biases, $b_1^r$ and $b_2^r$ are the receiver $L_1$ and $L_2$ phase biases, $B_1^s$ and $B_2^s$ are the satellite $L_1$ and $L_2$ code biases, $B_1^r$ and $B_2^r$ are the receiver $L_1$ and $L_2$ code biases, $N_1$ and $N_2$ are $L_1$ and $L_2$ integer ambiguities, $v_1$ and $v_2$ are $L_1$ and $L_2$ phase noise plus multipath, and $\epsilon_1$ and $\epsilon_2$ are $L_1$ and $L_2$ code noise plus multipath.

Ionospheric phase and pseudorange observation mapped to L1 frequency can be written as:

$$L_I = I + \frac{\lambda_1^2}{\lambda_2^2 - \lambda_1^2}(b_2^r - b_1^r) - \frac{\lambda_1^2}{\lambda_2^2 - \lambda_1^2}(b_2^s - b_1^s) + N_I + v_I \quad (11)$$

$$P_I = -I + \frac{\lambda_1^2}{\lambda_2^2 - \lambda_1^2}(B_2^r - B_1^r) - \frac{\lambda_1^2}{\lambda_2^2 - \lambda_1^2}(B_2^s - B_1^s) + \varepsilon_I \quad (12)$$

$$= -I + \frac{\lambda_1^2}{\lambda_2^2 - \lambda_1^2}(DCB^r - DCB^s) + \varepsilon_I$$

where $$N_I = -\frac{\lambda_1^3}{\lambda_2^2 - \lambda_1^2} N_1 + \frac{\lambda_1^2 \lambda_2}{\lambda_1 - \lambda_2} N_2 \quad (13)$$

The relation between L1 ionospheric delay and Total Electron Content is:

$$I = 40.3 \frac{TEC}{f_1^2} \tag{14}$$

where 1 TEC Unit is equivalent to 16.2 cm delay at GPS L1 frequency.

Satellite biases $b_1^s$ and $b_2^s$ and receiver biases $b_1^r$ and $b_2^r$ in the ionospheric phase observations cannot be separated from the undifferenced ambiguities, and are thus absorbed in the undifferenced ionospheric ambiguities. These biases will be ignored in the following description.

The terms $B_2^s - B_1^s$ and $B_2^r - B_1^r$ in Eq (6) are the so-called satellite Differential Code Biases and receiver Differential Code Biases (DCBs), respectively. The DCB values for GPS and GLONASS satellites are stable and can be downloaded (e.g., monthly or daily) from the International GNSS Service (IGS) or computed from a global network of receivers and added to the ionospheric pseudorange observation. Further description of the satellite DCBs is given in the Bernese Software from the Astronomical Institute, University of Bern, Version 5.0, January 2007, Chapter 13, and in Provisional Application for U.S. Patent 61/337,980 filed 14 Feb. 2010 (TNL A-2633P) and International Patent Application PCT/US2011/024733 (TNL A-2633PCT). The receiver DCBs need to be estimated in the filter.

United States Patent Application Publication US 2009/0224969 A1 (TNL A-1743US) expresses ionospheric advance across a network area in terms of its Taylor series or other set of orthogonal functions.

Some embodiments of the present invention use a similar model, except that a stochastic ionospheric delay term per satellite per station is added to account for the inability of describing complex ionosphere with a simple mathematic model:

$$I(\Delta\lambda, \Delta\phi) = m(\Delta\lambda, \Delta\phi) \left( \sum_{i,j=0}^{\infty} \alpha_{i,j} \Delta\lambda^i \Delta\phi^j \right) + \delta \tag{15}$$

where
$\Delta\lambda$, $\Delta\phi$ are the coordinates of the piercepoints relative to a reference point,
$m(\Delta\lambda, \Delta\phi)$ is the so-called mapping function to map ionospheric slant delay to vertical, and
$\delta$ is the stochastic delay term which models the small variation of each satellite-receiver signal path in addition to the Taylor model.

Since for most purposes the Taylor expansion can be stopped at the first order, the terms $\alpha_{0,0} = \alpha_0$ $\alpha_{1,0} = \alpha_\lambda$ and $\alpha_{0,1} = \alpha_\phi$ of the Taylor expansion are introduced. The state vector for satellite i sub-filter is:

$$X_i = \Big( \underbrace{I_0^i, a_\lambda^i, a_\phi^i, \delta^1, \ldots, \delta^n, N_I^1, \ldots, N_I^n}_{\text{local unique states } X_{i,u}}, \underbrace{B_I^1, \ldots B_I^n}_{\text{Common states } X_{i,c}} \Big)^T \tag{16}$$

$$= (X_{i,u}, X_{i,c})^T$$

where states $I_0^i, a_\lambda^i, a_\phi^i, \delta^1, \ldots, \delta^n, N_I^1, \ldots, N_I^n$ are unique in each satellite sub-filter and receiver DCBs $B_I^1, \ldots B_I^n$ are common for all satellite sub-filter, so that a federated-filter approach can be used.

With the observation update of epoch k in the per satellite sub-filter, the estimated states $\hat{X}_i^k$ and correspondent covariance matrix $Q_i^k$ for satellite i using a standard Kalman filter or factorized UD form of Kalman filter are:

$$\hat{X}_i^k = \begin{bmatrix} \hat{X}_{i,u}^k & \hat{X}_{i,c}^k \end{bmatrix}^T \tag{17}$$

$$Q_i^k = \begin{bmatrix} Q_{i,u}^k & Q_{i,uc}^k \\ Q_{i,cu}^k & Q_{i,c}^k \end{bmatrix} \tag{18}$$

$$= \begin{bmatrix} U_{i,u}^k & U_{i,uc}^k \\ 0 & U_{i,c}^k \end{bmatrix} \begin{bmatrix} D_{i,u}^k & 0 \\ 0 & D_{i,c}^k \end{bmatrix} \begin{bmatrix} U_{i,u}^k & U_{i,uc}^k \\ 0 & U_{i,c}^k \end{bmatrix}^T$$

With the federated-filter approach, the receiver DCBs $B_I^1, \ldots B_I^n$ (common states) and correspondent covariance matrix estimated in each filter $\hat{X}_{i,c}^k, Q_{i,c}^k$ $i=1,2,\ldots m$ are fed into a central fusion master filter.

If a factorized UD form Kalman filter is used as the central fusion master filter:

$$Q_{i,c}^k = U_{i,c}^k D_{i,c}^k U_{i,c}^{k^T} \tag{19}$$

The estimates $\hat{X}_{i,c}^k$ from single satellite sub filter are first transformed to an uncorrelated vector $Z_{i,c}^k$ with the inverse of the U matrix:

$$Z_{i,c}^k = U_{i,c}^{k^{-1}} \hat{X}_{i,c}^k, \tag{20}$$

and its corresponding variance is the diagonal matrix $D_{i,c}^k$.

The states in the central fusion master filter (which are the receiver DCBs $B_I^1, \ldots B_I^n$) are reset to 0 value and infinite variance before any observation update at each epoch process; then the de-correlated observations from each satellite sub-filter (eq. 14) are put into a UD filter one by one, from all single-station filters. Storing the covariance matrix in UD form $U_{c,k}^M$, $D_{c,k}^M$ internally, the covariance matrix is computed by:

$$Q_{c,k}^M = U_{c,k}^M D_{c,k}^M U_{c,k}^{M^T} \tag{21}$$

The central fusion master filter provides global optimized estimates for the receiver DCBs $B_I^1, \ldots B_I^n$ which are fed back to each satellite's ionospheric sub-filter which then updates the local unique states. This assures that the estimates and covariances for the receiver DCBs $B_I^1, \ldots B_I^n$ in each satellite's ionospheric sub-filter will be the same as in the central fusion master filter.

The local unique states are determined by:

$$\hat{X}_{i,u}^{kM} = \hat{X}_{i,u}^K - U_{i,c}^k U_{i,c}^{k^{-1}} (\hat{X}_{c,k}^M - \hat{X}_{i,u}^K) \tag{22}$$

and the covariance matrix for the satellite sub-filter i is:

$$Q_i^{kM} = \begin{bmatrix} Q_{i,u}^{kM} & Q_{i,uc}^{kM} \\ Q_{i,cu}^{kM} & Q_{c,k}^M \end{bmatrix} \tag{23}$$

$$= \begin{bmatrix} U_{i,u}^k & U_{i,uc}^{kM} \\ 0 & U_{c,k}^M \end{bmatrix} \begin{bmatrix} D_{i,u}^k & 0 \\ 0 & D_{c,k}^M \end{bmatrix} \begin{bmatrix} U_{i,u}^k & U_{i,uc}^{kM} \\ 0 & U_{c,k}^M \end{bmatrix}^T$$

where $$U_{i,uc}^{kM} = U_{i,uc}^k U_{i,uc}^k U_{i,c}^k U_{c,k}^M \tag{24}$$

Eq. (22)-(24) give the final estimates of the local states with corresponding covariance matrix in UD form. Deriving from eq. (23), $$Q_{c,k}^M = U_{c,k}^M D_{i,c}^M U_{c,k}^{M^T} \tag{25}$$

and the covariance for the local unique states is:

$$Q_{i,u}{}^M = U_{i,u}{}^k D_{i,u}{}^k U_{i,u}{}^{k} + U_{i,uc}{}^{kM} D_{c,k}{}^M U_{i,uc}{}^{kM^T} \quad (26)$$

and the covariance between local unique states and common states is:

$$Q_{i,cu}{}^{kM} = U_{c,k}{}^M D_{i,c}{}^{kM} U_{i,uc}{}^{kM^T} \quad (27)$$

Part 3: Deriving IPWV from ZTD

Some embodiments in accordance with the invention use the modified Hopfield tropospheric model and the Niell (wet and dry) mapping function. Other tropospheric models known in the art may be used, such as the Saastamoinen model, or the Global Pressure and Temperature Model using the Global Mapping Function developed by Bohem et al. See, for example: McCarthy et al., IERS Conventions (2003), IERS Technical Note 32, Verlag des Bundesamts für Kartographie and Geodäsie, Frankfurt am Main, 2004, Boehm et al., *Troposphere mapping functions for GPS and very long baseline interferometry from European Centre for Medium-Range Weather Forecasts operational analysis data*, Journal of Geophysical Research 111 B02406 DOI:10.1029/2005JB003629 (2006); Boehm et al., *The Global Mapping Function (GMF): A new empirical mapping function based on data from numerical weather model data*, Geophysical Research Letters 33 L07304 DOI:10.129/2005GL025546 (2006); Boehm et al., *Short note: A global model of pressure and temperature for geodetic applications*. Journal of Geodesy, Vol. 81, No. 10, pp. 679-683 (2007); and the Global Pressure and Temperature model published on the IERS ftp site ftp://tai.bipm.org/iers/convupdt/chapter9/gpt.f.

Mapping functions are used to map the zenith tropospheric delay (ZTD) at a receiver to a specific satellite elevation angle. Different mapping functions are used for the dry (hydrostatic) component and the wet component:

$$TD(z) = f_h(z) \cdot ZHD + f_w(z) \cdot ZWD \quad (28)$$

where
TD is the tropospheric Total Delay,
ZHD is the Zenith Hydrostatic Delay,
ZWD is the Zenith Wet Delay,
z is the zenith angle,
$f_h$ is the hydrostatic mapping function, and
$f_w$ is the wet mapping function.

The Zenith Total Tropospheric delay ZTD represents the total delay, which includes a hydrostatic (often called "dry") and wet part:

$$ZTD = ZHD + ZWD \quad (29)$$

where
ZHD is the zenith hydrostatic delay, and
ZWD is the zenith wet delay.

The Zenith hydrostatic delay ZHD can be accurately computed (to mm-level) if surface pressure is known:

$$ZHD = 0.0022768 P/(1 - 0.00266 \cos(2*lat) - 0.00028H) \quad (30)$$

See Mendes, *Modeling the neutral-atmosphere propagation delay in radiometric space techniques*. Ph.D. dissertation, Department of Geomatics Engineering Technical Report No. 199, University of New Brunswick, Fredericton, New Brunswick, Canada, 353 pp. (1999), available at http://gge.unb.ca/Pubs/TR199.pdf. Saastamoinen formulas can be used to evaluate the delay for given pressure. See McCarthy et al., IERS Conventions (2003), IERS Technical Note 32, Verlag des Bundesamts für Kartographie and Geodäsie, Frankfurt am Main, 2004, Boehm et al., *Troposphere mapping functions for GPS and very long baseline interferometry from European Centre for Medium-Range Weather Forecasts operational analysis data*, Journal of Geophysical Research 111 B02406 DOI:10.1029/2005JB003629 (2006); Saastamoinen, *Atmospheric Correction for the Troposphere and Stratosphere in RadioRanging of Satellites*, Geophysical Monograph 15, Henriksen (ed), pp. 247-251 (1972); and Davis et al., *Geodesy by Radio Interferometry: Effects of Atmospheric Modelling Errors on Estimates of Baseline Length*, Radio Science, 20, No. 6, pp. 1593-1607 (1985).

The additional error in ZHD due to uncertainties in pressure estimation is about 2 mm/mbar for sites not too far from the mean sea level (H=100 m and lat=45 deg leads to 0.0023 m/mbar). Pressure values for a given site can be obtained from various sources, such as local (nearby) measurement, interpolated surface temperature from nearby sites, and/or numerical weather models.

The Zenith wet delay ZWD can be obtained from GPS-derived ZTD, if ZTD is accurately available:

$$ZWD = ZTD - ZHD \quad (31)$$

The value of ZWD is highly dependent on the amount of water present in the atmosphere:

$$ZWD = 10e - 6 * Rw * (K2 + K3/Tm) * IWV \quad (32)$$

where IWV is the Integrated Water Vapor—the total mass of water vapor in a 1 m² column extending from the surface to the top of the atmosphere.

Integrated precipitable water vapor (IPWV) is closely related to IWV, where:

$$IPWV = IWV / \rho_{H_2O} \quad (33)$$

This means that 1 kg/m² of IWV represents around 1 mm of IPWV. IPWV can be derived from GNSS observations:

$$IPWV = (ZTD - ZHD)/[10e - 6 * Rw * (K2 + K3/Tm) * \rho_{H_2O}] \quad (34)$$

where
ZTD is estimated from GNSS measurements,
ZHD is estimated from surface pressure,
Rw, K2, K3 and $\rho_{H_2O}$ are constants,
e is water vapor pressure, and
Tm is mean temperature.

Mean temperature Tm is determined, e.g., from profiles of temperature T and water vapor e along the atmospheric column, which can come from radiosonde soundings or numerical weather models.

If temperature T and water vapor e profiles over height z are available, Tm is determined as:

$$T_m = \frac{\int_{r_s}^{r_a} \frac{e}{T} Z_w^{-1} dz}{\int_{r_s}^{r_a} \frac{e}{T^2} Z_w^{-1} dz} \quad (35)$$

If profiles of temperature T and water vapor pressure e are not available, mean temperature Tm can be estimated (less accurately) based on surface temperatures Ts:

$$Tm = Ts * [1 - bR/(l+1)/g_m] \quad (36)$$

where
R is the gas constant for dry air (287.054 J/Kg/K),
$g_m$ is the acceleration of gravity computed for given height and latitude, and
b and l are lapse-rate parameters that can be computed for the location of interest using a model (e.g., UNB3m).

Once Tm is known, IPWV can be computed as:

$$IPWV=(ZTD-ZHD)/[10e-6*Rw*(K2+K3/Tm)*\rho_{H_2O}] \quad (37)$$

$$IPWV=ZWD/[10e-6*Rw*(K2+K3/Tm)*\rho_{H_2O}] \quad (38)$$

The conversion factor from ZWD to IPWV is strongly dependent on the day of year and the latitude. Approximate numbers can be estimated in real time, e.g. every 15 seconds, by a processor using 1 Hz real-time data streams, with all estimated and measured parameters stored in a database. The IPWV information, local surface meteorological data and ZWD information can be retrieved from the database as needed. In case of problems in real-time data transmission, data can be retrieved automatically or manually via FTP download from the problematic reference stations, postprocessed, and the results stored in the database. Examples of meteorological data sources include:

| Institution | Type | Format | Link |
|---|---|---|---|
| NOAA (US) | NWM (Regional, Global) | GRIB | http://nomads.ncdc.noaa.gov/ |
| NRCan (CAN) | NWM (Regional, Global) | GRIB | http://www.weatheroffice.gc.ca/grib/ |
| NOAA (US) | Radiosonde (Global) | ASCII (several) | http://esrl.noaa.gov/raobs/ |

Part 4: Deriving TEC/VTEC from Fixed Ambiguities

The estimated geometry-free ambiguities from the federated ionospheric filter and corresponding covariances together with ionospheric-free ambiguities derived from a geometry filter (which may be a federated geometry filter as described in United States Patent Application Publication US 2009/0027625 A1 (TNL A-1789US) and widelane ambiguities derived from code-carrier filter can be combined to resolve double differenced widelane/narrowlane ambiguities over the network.

With fixed ambiguities, the full accuracy of estimations from carrier phase observations can be reached, i.e. from mm-level to cm-level accuracy depending on elevation. Consequently, fixing ambiguities can improve the estimation of TEC/VTEC and ZTD/Tropospheric slant delay.

Though ambiguities can be expressed in un-differenced, single-differenced, and double differenced form, only the double-differenced ambiguities are unique. This means that for un-difference ambiguity, add per satellite bias and per receiver bias, the result double difference ambiguity is unchanged.

The absolute level of ionospheric delay (VTEC) is relatively well estimated using the federated ionospheric filter approach described herein. For satellite i and receiver j, for each epoch we can get the estimated float-value ionospheric delay estimates $\tilde{I}_v^{i,j}=(\tilde{I}_0^i, \tilde{a}_\lambda^i, \tilde{a}_\phi^i, \tilde{\delta}_j^i)^T$ from the ionospheric filter, and the corresponding covariance matrix $Q_I$. The ionospheric slant delay from satellite i to receiver j is then computed as:

$$\tilde{I}^{i,j} = \{m(\Delta\lambda, \Delta\phi), m(\Delta\lambda, \Delta\phi)\cdot\Delta\lambda, m(\Delta\lambda, \Delta\phi)\cdot\Delta\phi, 1\}\cdot\begin{Bmatrix}\tilde{I}_0^i\\\tilde{a}_\lambda^i\\\tilde{a}_\phi^i\\\tilde{\delta}_j^i\end{Bmatrix} \quad (39)$$

$$= A\cdot\tilde{I}_v^{i,j}$$

where $m(\Delta\lambda,\Delta\phi)$, $m(\Delta\lambda,\Delta\phi)\cdot\Delta\lambda$, and $m(\Delta\lambda, \Delta\phi)\cdot\Delta\phi,1$ are the Taylor-expansion mapping functions for the longitudinal and latitudinal gradients. The covariance of the ionospheric slant delay is then $$\sigma_I^{i,j^2}=A\cdot Q_I A^T. \quad (40)$$

With the (undifferenced) network ambiguities $\hat{N}_I^{i,j}$ fixed for satellite i and receiver j, $$\tilde{L}_I^{i,j}=L_I^{i,j}-\hat{N}_I^{i,j}-\hat{I}^{i,j}=\Delta_I^j-\Delta_I^i+v_I^{i,j}, \quad (41)$$

where $\tilde{L}_I^{i,j}$ is the ambiguity-reduced ionospheric phase observation minus the ionospheric slant delay derived from the federated ionospheric float filter and serves as input to the fixed-ambiguity ionospheric filter. The terms $\Delta_I^j$ and $\Delta_I^i$ are respectively the receiver biases and satellite biases in the undifferenced ionospheric carrier-phase ambiguities; these cancel if the observations are double-differenced.

For m satellites and n stations, the number of unknowns is m satellite biases+n receiver biases. This can be solved either by least squares adjustment or with a Kalman filter. As the system is rank deficient, either one satellite bias or one receiver bias needs to be constrained; this can be done by introduce a pseudo-observation, for example, by adding an observation $\Delta_i^0=0$ with a very small variance to define a reference satellite bias. After estimating the satellite biases and the station biases, the improved (corrected) value of the ionospheric slant delay from the fixed-ambiguity filter for satellite i and receiver j is:

$$\hat{I}^{i,j}=L_I^{i,j}-\hat{N}_I^{i,j}-\hat{\Delta}_r^j+\hat{\Delta}_s^i \quad (42)$$

The values for TEC and VTEC can then be determined in TEC units as $$TEC^{i,j}=\hat{I}^{i,j}/0.162 \quad (43)$$

and $$VTEC^{i,j}=m(\Delta\lambda,\Delta\phi)\cdot TEC^{i,j}. \quad (44)$$

Part 5: Deriving ZTD/Tropospheric Gradient/Tropospheric Slant Wet Delay from Fixed Ambiguities The ionospheric-free carrier phase observation and code observation are written as:

$$L_c=\rho+c\cdot(t_r-t^s)+ZTD\cdot f(z)+N_c+v_c$$

$$P_c=\rho+c\cdot(t_r-t^s)+ZTD\cdot f(z)+\epsilon_c \quad (45)$$

where
  $t_r$ and $t^s$ is are receiver clock error and satellite clock error, respectively,
  ZTD is the Zenith Total Delay, $f(z)$ is the elevation (zenith angle z) dependent mapping function (in practice, the wet mapping function $f_w$ described in part 3 is taken), $N_c$ is the ionospheric free ambiguity, and $v_c$ and $\epsilon_c$ are the noise of ionospheric free carrier phase and code noise.

In case tropospheric gradient needs to be estimated, Eq (45) becomes:

$$L_c = \rho + c \cdot (t_r - t^s) + ZTD \cdot f(z) + \qquad (46)$$

$$\frac{\partial f}{\partial z} \cos(A) \cdot x_N + \frac{\partial f}{\partial z} \sin(A) \cdot x_E + N_c + v_c$$

$$P_c = \rho + c \cdot (t_r - t^s) + ZTD \cdot f(z) +$$

$$\frac{\partial f}{\partial z} \cos(A) \cdot x_N + \frac{\partial f}{\partial z} \sin(A) \cdot x_E + \varepsilon_c$$

where $$\frac{\partial f}{\partial z}$$

is the partial derivative of the mapping function with respect to zenith angle,

A is the azimuth of the direction of station-satellite, $x_N$ and $x_E$ are the tropospheric gradients of north and east direction, respectively With m stations and n satellites, the state vector of a geometry filter is $$X = [ZTD_1, ZTD_2, \ldots ZTD_m, t_{r1}, t_{r2}, \ldots t_{rm}, t^{s1}, t^{s2}, \ldots t^{sn}, N_{c1}{}^1, N_{c2}{}^1, \ldots N_{cm}{}^n]^T \qquad (47)$$

If tropospheric gradient is also estimated, the state vector is $$X = [ZTD_1, ZTD_2, \ldots ZTD_m, x_{N1}, x_{N2}, \ldots x_{Nm}, x_{E1}, x_{E2}, \ldots x_{Em}, t_{r1}, t_{r2}, \ldots t_{rm}, t^{s1}, t^{s2}, \ldots t^{sn}, N_{c1}{}^1, N_{c2}{}^1, \ldots N_{cm}{}^n]^T \qquad (48)$$

With an optimal geometry filter or a federated geometry filter, ZTD and Tropospheric gradient can be estimated.

With a similar approach as deriving TEC/VTEC from fixed ambiguities, using the network fixed ambiguities, the accuracy of ZTD and slant total delay estimation can be improved.

With the network fixed ambiguities $\hat{N}_c = N_c + \Delta_c{}^r - \Delta_c{}^s$ where $\Delta_c{}^r$ and $\Delta_c{}^s$ are respectively the receiver and satellite dependent biases in the ionosphere-free undifferenced ambiguities, the ambiguity-reduced ionosphere-free carrier phase observation becomes:

$$\breve{L}_c = L_c - \hat{N}_c \qquad (49)$$

$$= \rho + c \cdot (t_r - t^s) + ZTD \cdot f(z) + \Delta_c{}^s - \Delta_c{}^r + \varepsilon_c$$

$$= \rho + c \cdot ((t_r - \Delta_c{}^r) - (t^s - \Delta_c{}^s)) + ZTD \cdot f(z) + \varepsilon_c$$

$$= \rho + c \cdot ((\breve{t}_r - \breve{t}^s)) + ZTD \cdot f(z) + \varepsilon_c.$$

The terms $\Delta_c{}^r$ and $\Delta_c{}^s$ are absorbed by the new satellite and receiver clock error terms $\breve{t}^s$ and $\breve{t}_r$. With m satellites and n receivers, the number of unknowns is m+2n, which includes m satellite clock error values plus n receiver clock error values and n ZTD values. Similar to deriving TEC/VTEC from fixed ambiguities, the system is also rank-deficient and thus either one satellite clock error or one receiver clock error needs to be constrained. An improved (corrected) ZTD value for each station can be estimated using least-squares adjustment or a Kalman filter. Optionally, the ZTD values derived from the geometry filter can be used as pseudo-observations.

In case tropospheric gradient needs to be estimated, Eq (49) becomes:

$$\breve{L}_c = L_c - \hat{N}_c = \rho + c \cdot ((\breve{t}_r - \breve{t}^s)) + \qquad (50)$$

$$ZTD \cdot f(z) + \frac{\partial f}{\partial z} \cos(A) \cdot x_N + \frac{\partial f}{\partial z} \sin(A) \cdot x_E + v_c.$$

With m satellites and n receivers, the number of unknowns is m+4n, which includes m satellite clock error values plus n receiver clock error values, n ZTD values and 2n tropospheric gradients.

Beside the improved ZTD/tropospheric gradient estimates, slant tropospheric total delay can be derived:

$$S\hat{T}D = \breve{L} - \rho + c \cdot ((\breve{t}^r - \breve{t}_s)) \qquad (51)$$

Where $\breve{t}^r$ and $\breve{t}_s$ are the estimates of $\breve{t}_r$ and $\breve{t}^s$.

With surface meteorogical data, Slant wet delay can be derived:

$$S\hat{W}D = S\hat{T}D - f_h(z) \cdot ZHD - \qquad (52)$$

Real-time integrated precipitable water vapor (IPWV) can then be determined by using estimated ZTD and radiosonde data or surface meteorological sensor data as described in part 3.

Part 6: Illustrative Examples

Figure 7:
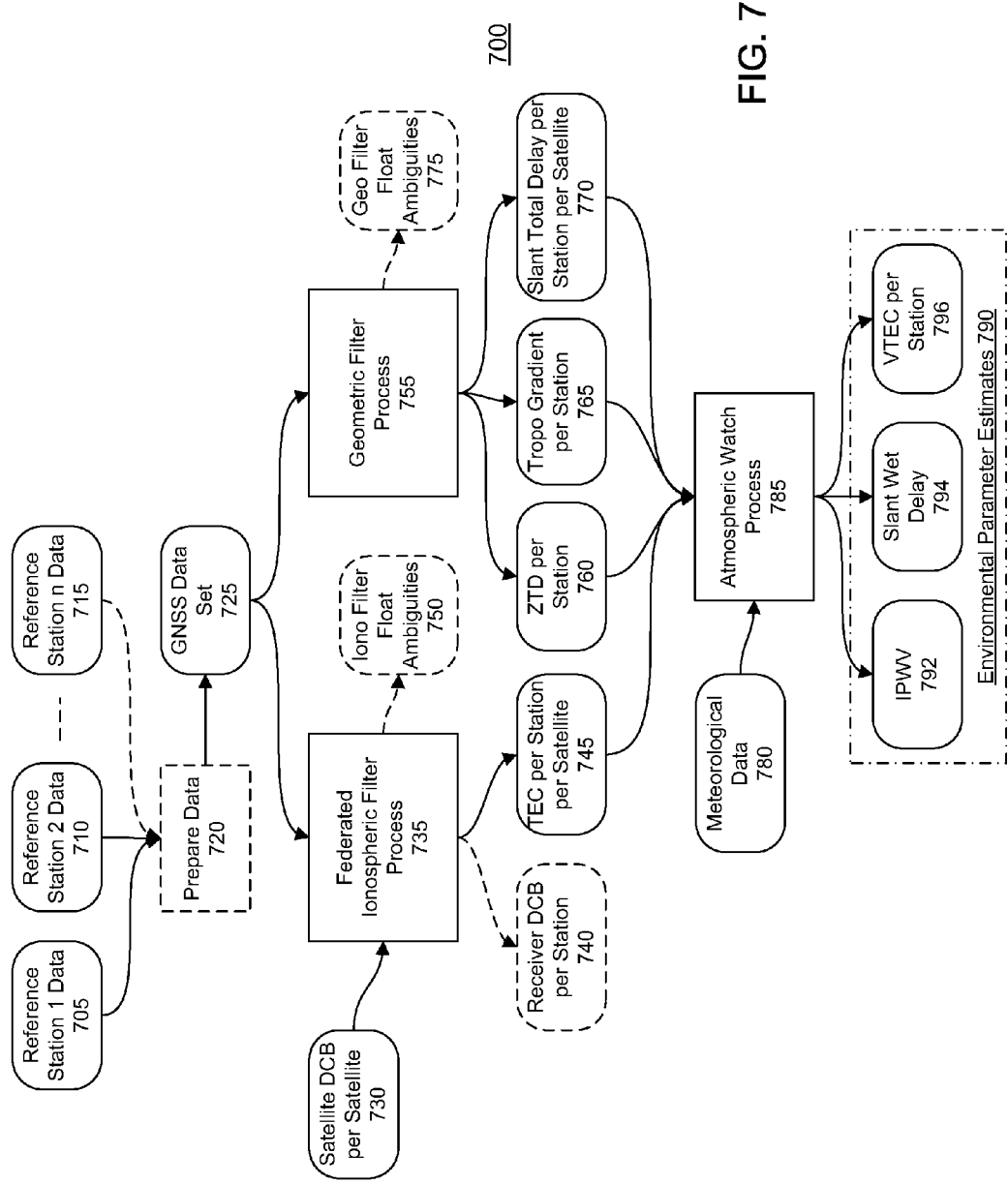

FIG. 7 is a flow chart of a real-time process 700 for estimating atmospheric parameter values, using a federated ionospheric filtering method in accordance with some embodiments of the invention. Data 705, 710, . . . 715 representing measurements of signals from GNSS satellites collected by receivers of a reference station network distributed over a region are optionally prepared at 720 (e.g., synchronized by epoch) and made available as a GNSS data set 725 for processing by epoch. A set of satellite DCBs 730, one per satellite, is obtained, e.g., downloaded from the International GNSS Service (IGS) or computed from observations of a global network of receivers such as that shown in FIG. 600 and added to the ionospheric pseudorange observations.

A federated ionospheric float filter process 735 is applied to ionospheric combinations of the GNSS data 725 as adjusted by the satellite DCBs 730 to estimate a set of receiver DCBs 740, one per station, and a set of total electron content (TEC) values 745, one per station per satellite. Process 735 also estimates float values of ionospheric-filter ambiguities 750.

A geometry filter process 755 is applied to the GNSS data to estimate values for tropospheric parameters comprising at least one of: (i) a set of values 760 for zenith total delay (ZTD), one per station; (ii) a set of values 760 for zenith total delay (ZTD), one per station, and a set of values 765 for tropospheric gradients per station, one per station in each of two orthogonal directions (e.g., East and North, or longitude and latitude), and (iii) a set of values 770 for slant total delay, one per station per satellite. Process 755 also estimates float values of geometry-filter ambiguities 775.

Meteorological data 780 for locations within the region, e.g., meteorological data from measurements and/or models and optionally from radiosonde soundings, are obtained from external sources. An atmospheric watch process 785 determines values over the network region for environmental parameters 790. At least one of (1) integrated precipitable water vapor (IPWV) per station 792 and (2) tropospheric slant wet delay 794 is determined from the estimated values for tropospheric parameters and the meteorological data 780. The atmospheric watch process or another process optionally determines a set of values 796 for vertical total electron content (VTEC), one per station, from the values of total electron content (TEC) per station per satellite 745.

FIG. 8 schematically illustrates an architecture using a federated ionospheric filter in accordance with some embodiments of the invention. A federated ionospheric float filter 835 is applied to ionospheric combinations of the GNSS data 725 as adjusted by the satellite DCBs 730 to estimate a set of receiver DCBs 740, one per station, and a set of total electron content (TEC) values 745, one per station per satellite. Federated filter 835 also estimates float values of ionospheric-filter ambiguities 750.

A geometry filter 855 is applied to the GNSS data to estimate values for tropospheric parameters comprising at least one of: (i) a set of values 760 for zenith total delay (ZTD), one per station; (ii) a set of values 760 for zenith total delay (ZTD), one per station, and a set of values 765 for tropospheric gradients per station, one per station in each of two orthogonal directions (e.g., East and North, or longitude and latitude), and (iii) a set of values 770 for slant total delay, one per station per satellite. Filter 855 also estimates float values of geometry-filter ambiguities 775.

An atmospheric watch module 885 determines values over the network region for environmental parameters 790. Module 885 determines values of at least one of (1) integrated precipitable water vapor (IPWV) 792 and (2) tropospheric slant wet delay 794, from the estimated values for tropospheric parameters and from the meteorological data 780. Optionally the atmospheric watch module or another module determines a set of values 796 for vertical total electron content (VTEC), one per station, from the values of total electron content (TEC) per station per satellite 745.

Figure 9:
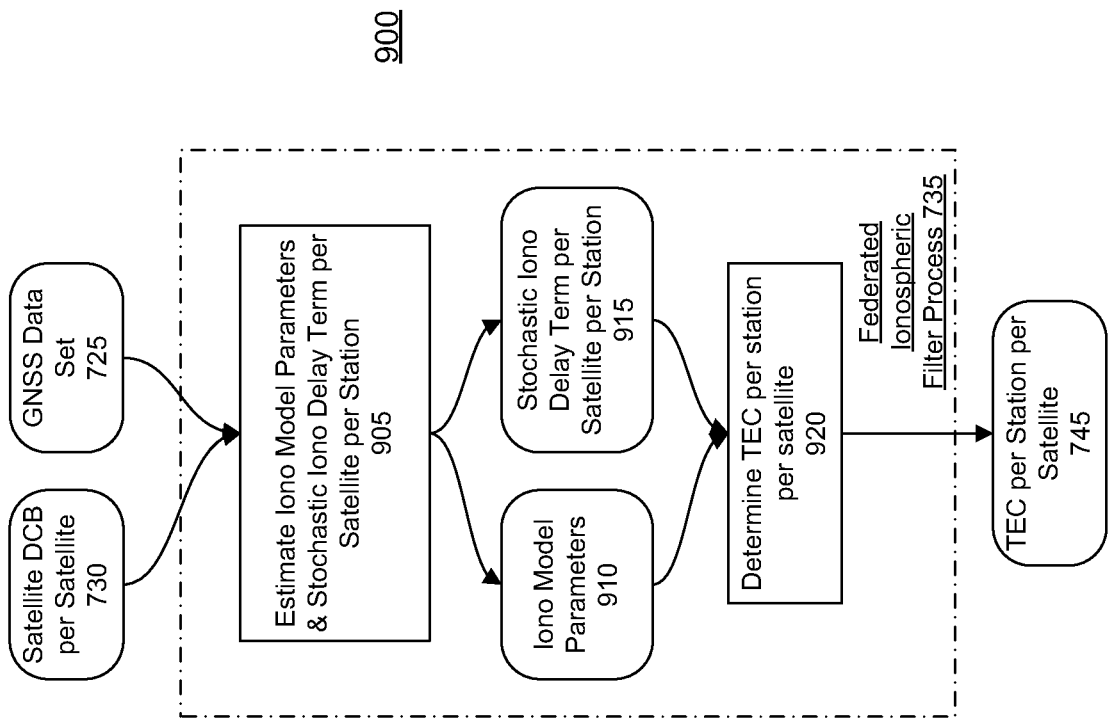
FIG. 9 is a flow chart of a federated ionospheric filter process in accordance with some embodiments of the invention.

FIG. 9 is a flow chart of federated ionospheric filter process 735 in accordance with some embodiments of the invention. The satellite DCBs 730 and the GNSS data set 725 are used in a process 905 which estimates values 910 for parameters of an ionospheric model and values 915 of a stochastic ionospheric delay term per satellite per station. The estimated values 910 and 915 are used in a process 920 to determine values 745 of total electron content (TEC) per station per satellite.

Figure 10:
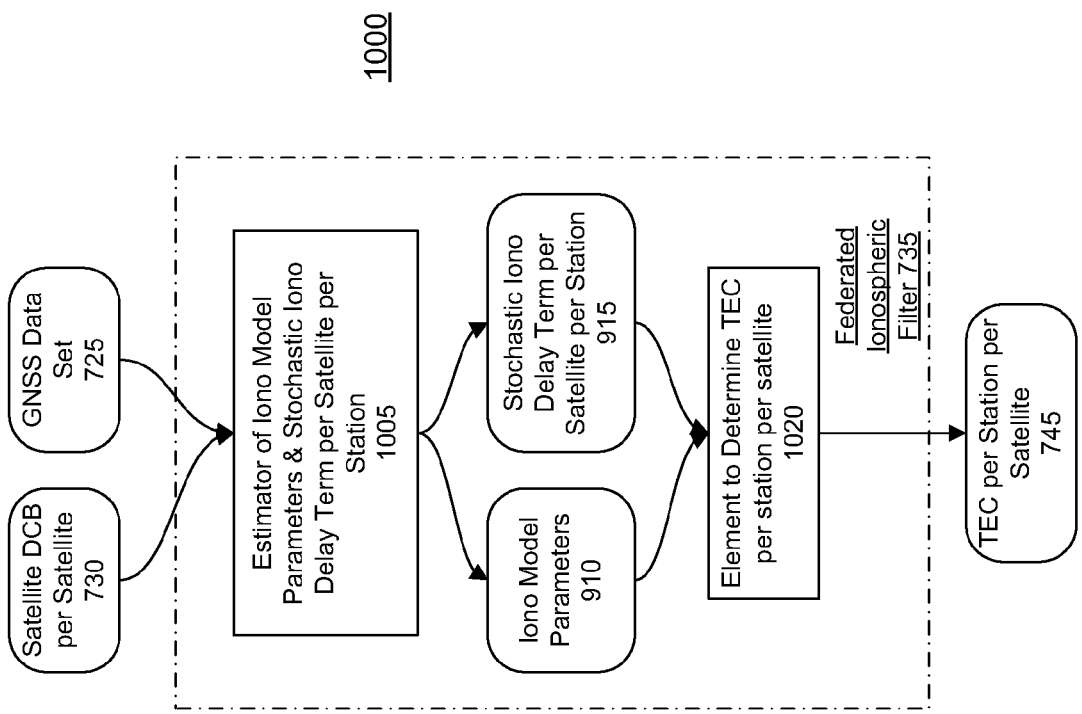
FIG. 10 is a schematic diagram of a federated ionospheric filter in accordance with some embodiments of the invention.

FIG. 10 is a schematic diagram of an embodiment of federated ionospheric filter 835 in accordance with some embodiments of the invention. The satellite DCBs 730 and the GNSS data set 725 are used in an estimator 1005 determines values 910 for parameters of an ionospheric model and values 915 of a stochastic ionospheric delay term per satellite per station. The estimated values 910 and 915 are passed to a module 1020 which determines values 745 of total electron content (TEC) per station per satellite.

Figure 11:
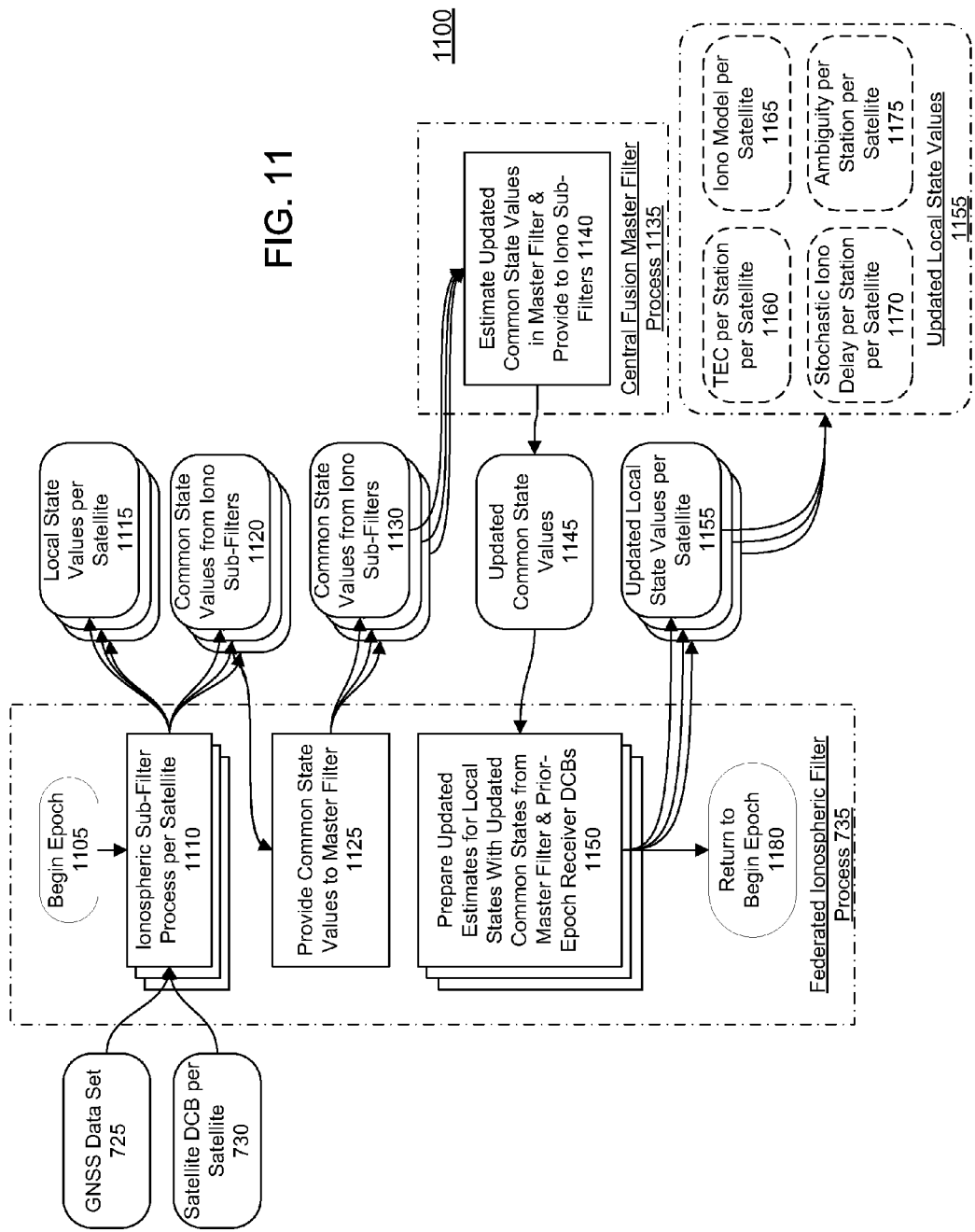
FIG. 11 is a flow chart of a federated ionospheric filter process in accordance with some embodiments of the invention.

FIG. 11 is a flow chart of federated ionospheric filter process 735 in accordance with some embodiments of the invention. The process begins an epoch of processing at 1005. The GNSS data set 725 and satellite DCBs 730 are applied at 1110 to an ionospheric sub-filter process per satellite 1110. Each sub-filter process 1110 estimates values 1115 for "local" states unique to its assigned satellite and values 1120 for states common to all ionospheric sub-filters. As shown in Eq. (16), the "local" state values 1115 comprise parameters ($I_0^i$, $a_\lambda^i, a_\phi^i$) characterizing the ionosphere across the region, a stochastic ionospheric delay term per satellite per station ($\delta^1, \ldots, \delta^n$), and float-value ambiguities per satellite per station ($N_I^1, \ldots, N_I^n$). The common state values 1120 comprising a receiver DCB per station ($B_I^1, \ldots B_I^n$), are fed one by one to a central master fusion filter process 1135 which estimates updated values 1145 for the common states. An ionospheric sub-filter process 1150 (e.g., using the same sub-filters a process 1110) uses the updated common state values 1145 to estimate updated values 1155 for the "local" states. Feeding back the updated common state values 1145 to the sub-filters deals with cross-correlation between the local states and the common states.

Figure 12:
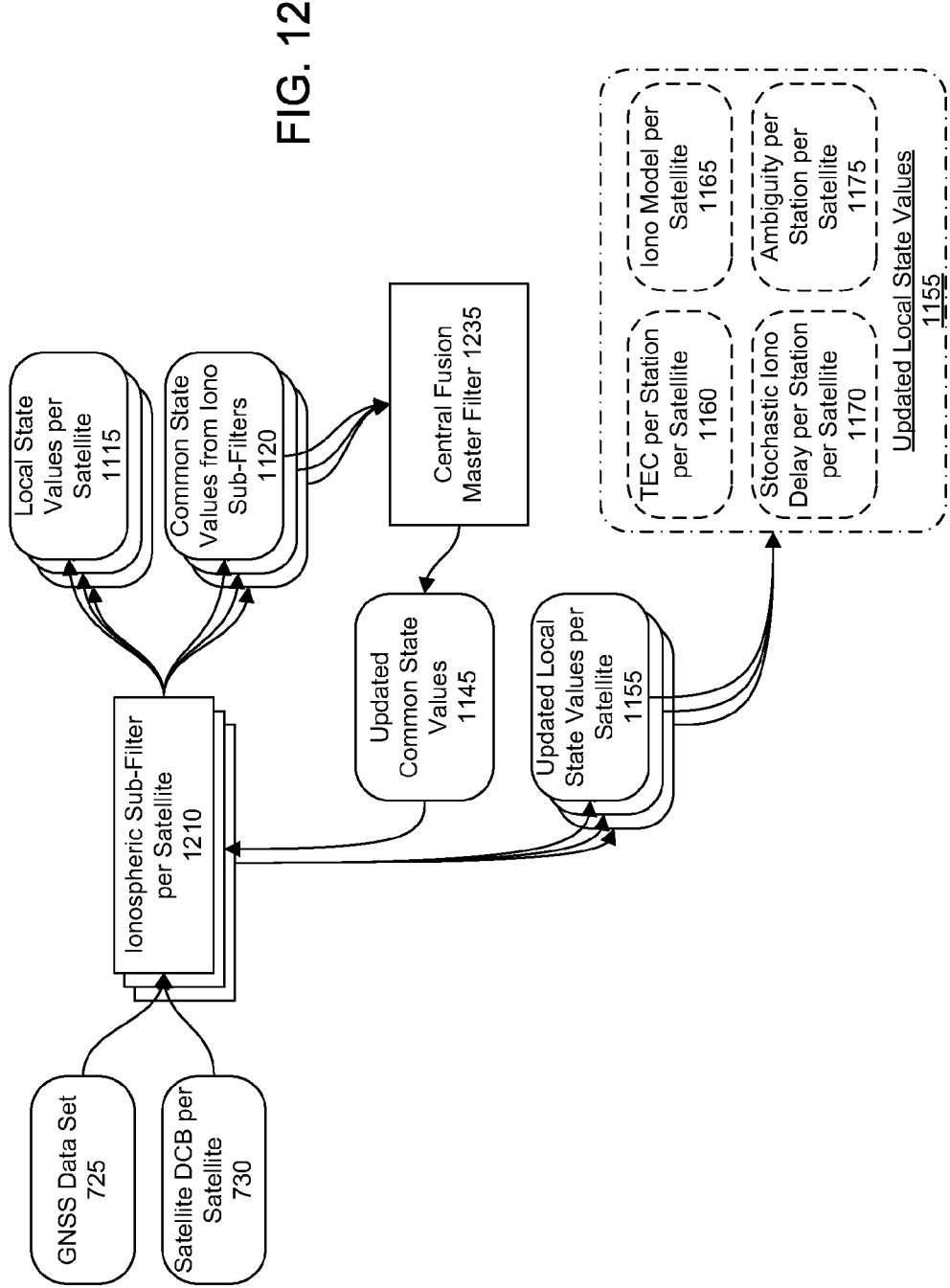
FIG. 12 is a schematic diagram of a federated ionospheric filter in accordance with some embodiments of the invention.

FIG. 12 is a schematic diagram chart of federated ionospheric filter 835 in accordance with some embodiments of the invention. Ionospheric sub-filters 1210, one per satellite, estimate values 1115 for "local" states unique to the each sub-filter's assigned satellite and values 1120 for states common to all ionospheric sub-filters. As shown in Eq. (16), the "local" state values 1115 comprise parameters ($I_0^i, a_\lambda^i, a_\phi^i$) characterizing the ionosphere across the region, a stochastic ionospheric delay term per satellite per station ($\delta^1, \ldots, \delta^n$), and float-value ambiguities per satellite per station ($N_I^1, \ldots, N_I^n$). The common state values 1120 comprising a receiver DCB per station ($B_I^1, \ldots B_I^n$), are fed one by one to a central master fusion filter 1235 which estimates updated values 1145 for the common states. The ionospheric sub-filters 1210 use the updated common state values 1145 to estimate updated values 1155 for the "local" states. Feeding back the updated common state values 1145 to the sub-filters deals with cross-correlation between the local states and the common states.

Figure 13:
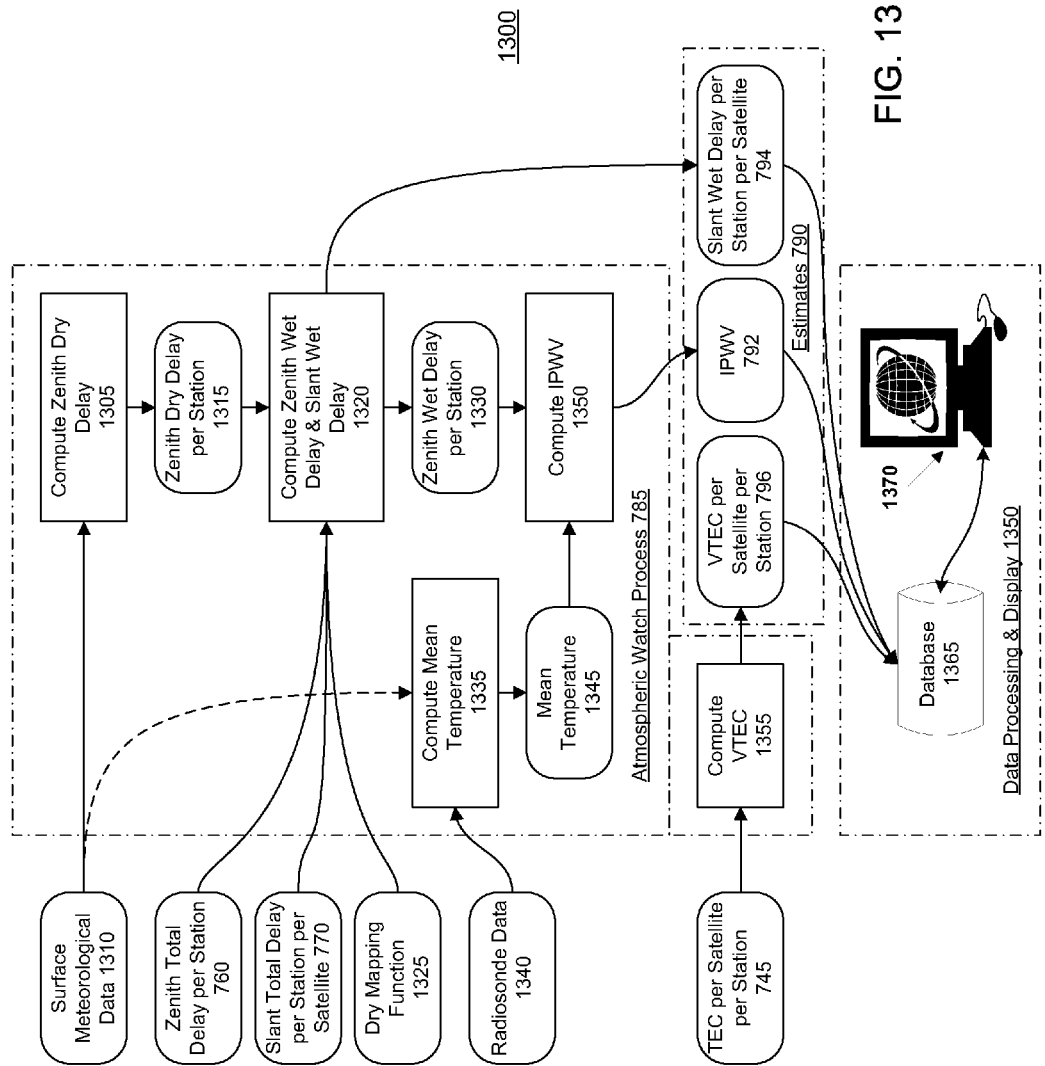
FIG. 13 is a flow chart of an atmospheric watch process in accordance with some embodiments of the invention.

FIG. 13 is a flow chart of atmospheric watch process 785 in accordance with some embodiments of the invention. Zenith dry delay (ZHD) per station is computed at 1305 from meteorological data 1310, e.g., from data representing surface meteorological conditions near the station, as in Eq. (30). At 1315, Zenith wet delay (ZWD) per station 1330 and tropospheric slant wet delay per station per satellite 794 are computed from zenith dry delay (ZHD) 1315, zenith total delay (ZTD) 760, slant total delay 770 and the hydrostatic (dry) mapping function 1325, as in Eq. (28). The hydrostatic mapping function is a dimensionless factor which describes the elevation angle dependence of the hydrostatic path delay and relates the line of sight delay to the zenith delay. At 1335, mean temperature 1345 is computed from radiosonde data 1340 and surface meteorological data 1310 (and/or data from numerical weather models), as in Eq. (35) or Eq. (36). Optionally, at 1350, values 792 for integrated precipitable water vapor (IPWV) are computed from the mean temperature 1345 and zenith wet delay (ZWD) 1330 as in Eq. (34). Optionally, values 796 of vertical total electron content per station (VTEC) are computed at 1355 from the values 745 of total electron content (TEC) per station per satellite. As described above, the relationship between geometry-dependent TEC and geometry-independent VTEC is given by $$\text{VTEC} = \text{TEC}/m_{mapping}(\zeta) = \text{TEC} \cdot \cos(\zeta) \quad (53)$$

where
 $m_{mapping}(\zeta) = 1/\cos(\zeta)$ is the slant path mapping function, and
 $\zeta$ is the angle between the signal ray path from satellite to receiver and the line perpendicular to the ionospheric sphere at the piercepoint of the signal ray path through the ionospheric sphere.

The environmental parameter estimates 790 (at least one of VTEC per station 796, IPWV 792, and slant wet delay per station per satellite 794) are stored in memory 1365, from which they can be communicated to one or more computer systems, e.g, computer system 1370, for display and/or further processing such as weather forecasting.

Figure 14:
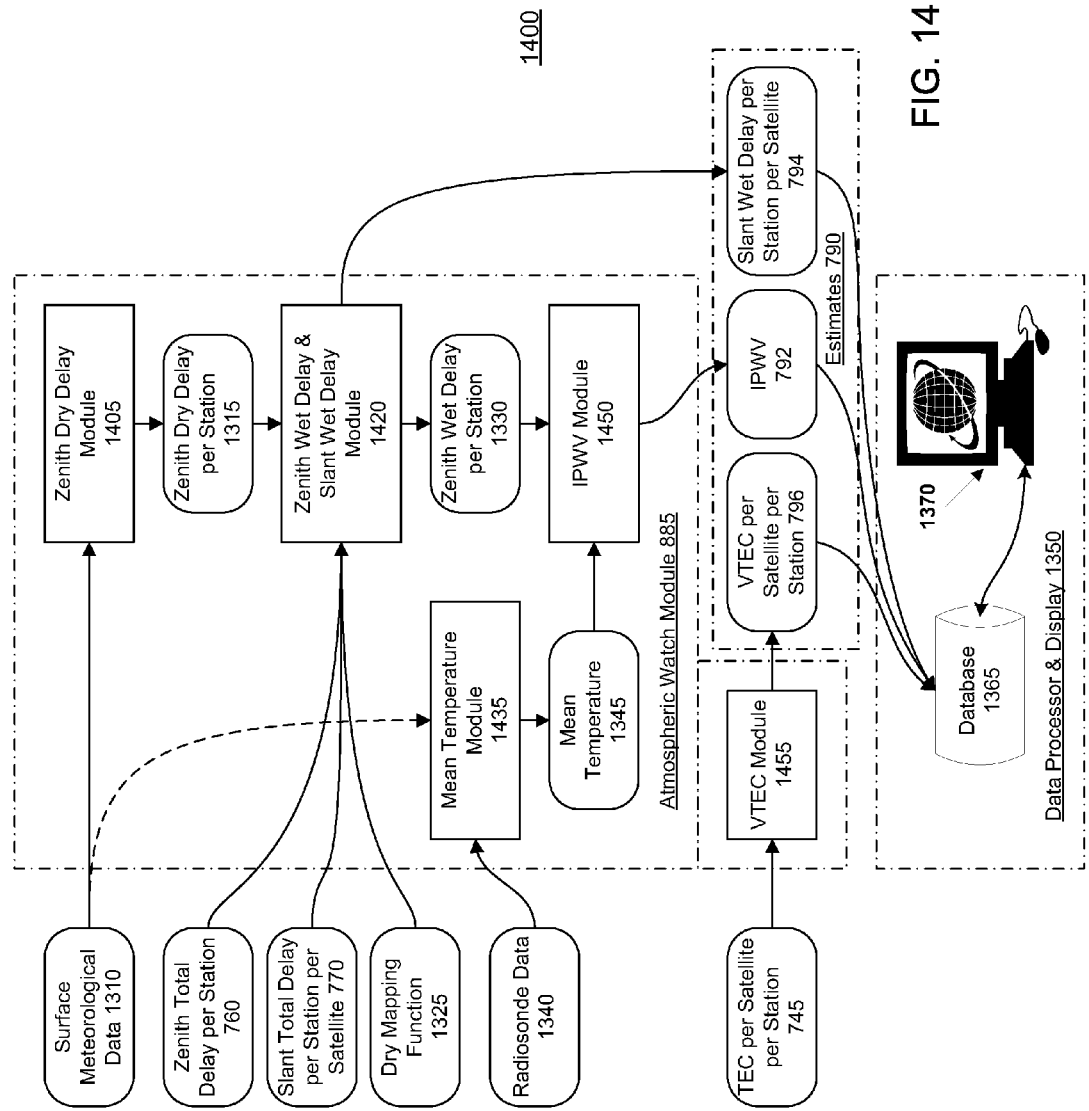
FIG. 14 is a schematic diagram of atmospheric watch module in accordance with some embodiments of the invention.

FIG. 14 is a schematic diagram of atmospheric watch module 885 in accordance with some embodiments of the invention. A zenith dry delay module 1405 computes zenith dry delay (ZHD) from meteorological data 1310. A zenith wet delay & slant wet delay module 1420 computes zenith wet delay (ZWD) per station 1330 and tropospheric slant wet delay per station per satellite 794. A mean temperature module 1435 computes mean temperature 1345. Optionally, an IPWV module 1450 computes values 792 for integrated precipitable water vapor (IPWV). Optionally, a VTEC module 1455 computes values 796 of vertical total electron content per station (VTEC). Data processor & delay hardware includes memory 1365 to store the environmental parameter estimates 790, from which they can be communicated to one or more computer systems such as computer system 1370 for display and/or further processing such as weather forecasting.

Figure 15:
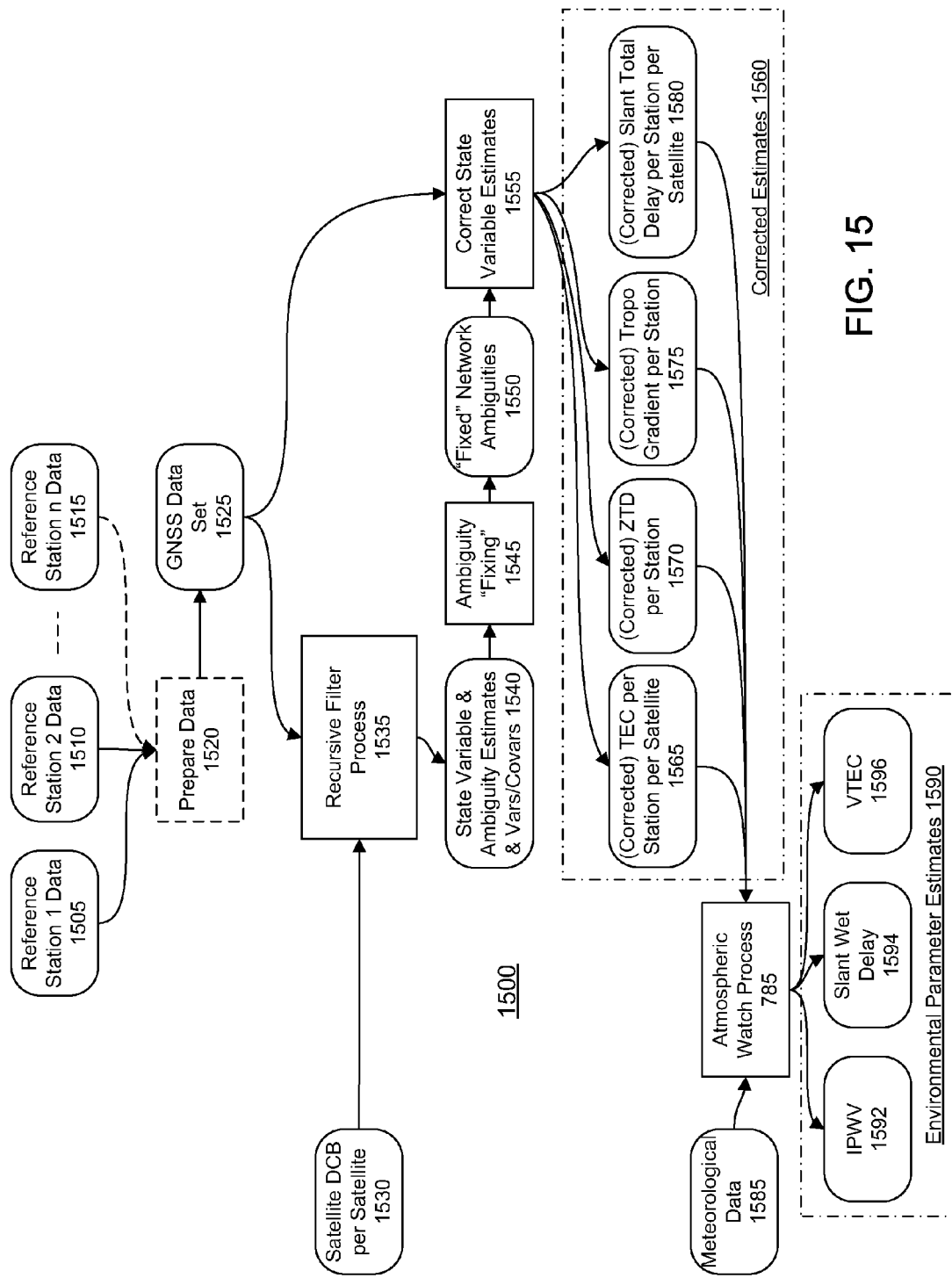
FIG. 15 is a flow chart of a process 1500 for estimating environmental parameters using fixed ambiguities in accordance with some embodiments of the invention.

FIG. 15 is a flow chart of a process 1500 for estimating environmental parameters using fixed ambiguities in accordance with some embodiments of the invention. Data 1505, 1510, . . . 1515 representing measurements of signals from GNSS satellites collected by receivers of a reference station network distributed over a region are optionally prepared at 1520 (e.g., synchronized by epoch) and made available as a GNSS data set 1525 for processing by epoch. A set of satellite DCBs 1530, one per satellite, is obtained, e.g., downloaded from the International GNSS Service (IGS) or computed from observations of a global network of receivers such as that shown in FIG. 600 and added to the pseudorange observations.

At 1535 a recursive filtering process (using e.g., a Least Squares adaptive filter or Kalman filter) is applied to the GNSS data 1525 as adjusted by the satellite DCBs 1530 to estimate values at each epoch for a set of state variables 1540. State variables 1540 include at least one of: (i) total electron count (TEC) per station per satellite, (ii) a zenith total delay (ZTD) per station, (iii) a zenith total delay (ZTD) per station and a set of tropospheric gradients per station, and (iv) a slant total delay per station per satellite. The process also estimates float values for ambiguities and associated statistical information (variance/covariance values).

At 1545, the float-value ambiguity estimates are "fixed" to form a set of "fixed" network ambiguities 1550. At 1555, the "fixed" network ambiguities 1550 are used to estimate corrected values 1560 for the state variables. Optionally, "fixed" network ambiguities 1550 can be fed back to Recursive Filter 1635. The resulting values for atmospheric parameters (at least one of (i) corrected total electron count (TEC) per station per satellite 1565, (ii) corrected zenith total delay (ZTD) per station 1570, (iii) corrected zenith total delay (ZTD) per station 1570 and corrected tropospheric gradients per station 1575, and (iv) corrected slant total delay per station per satellite 1580) and meteorological data 1585 from external sources, are supplied to an atmospheric watch process, e.g., as at 785 in FIG. 7. The atmospheric watch process determines environmental parameter values 1590 over the region for at least one of (1) integrated precipitable water vapor (IPWV) 1592 and (2) tropospheric slant wet delay 1594. The meteorological data 1585 for locations within the region comprise, e.g., meteorological data from measurements and/or models and optionally from radiosonde soundings. The atmospheric watch process or another process determines values 1596 of vertical total electron content (VTEC) per station from the values of total electron count per station per satellite (TEC) 1565.

Figure 16:
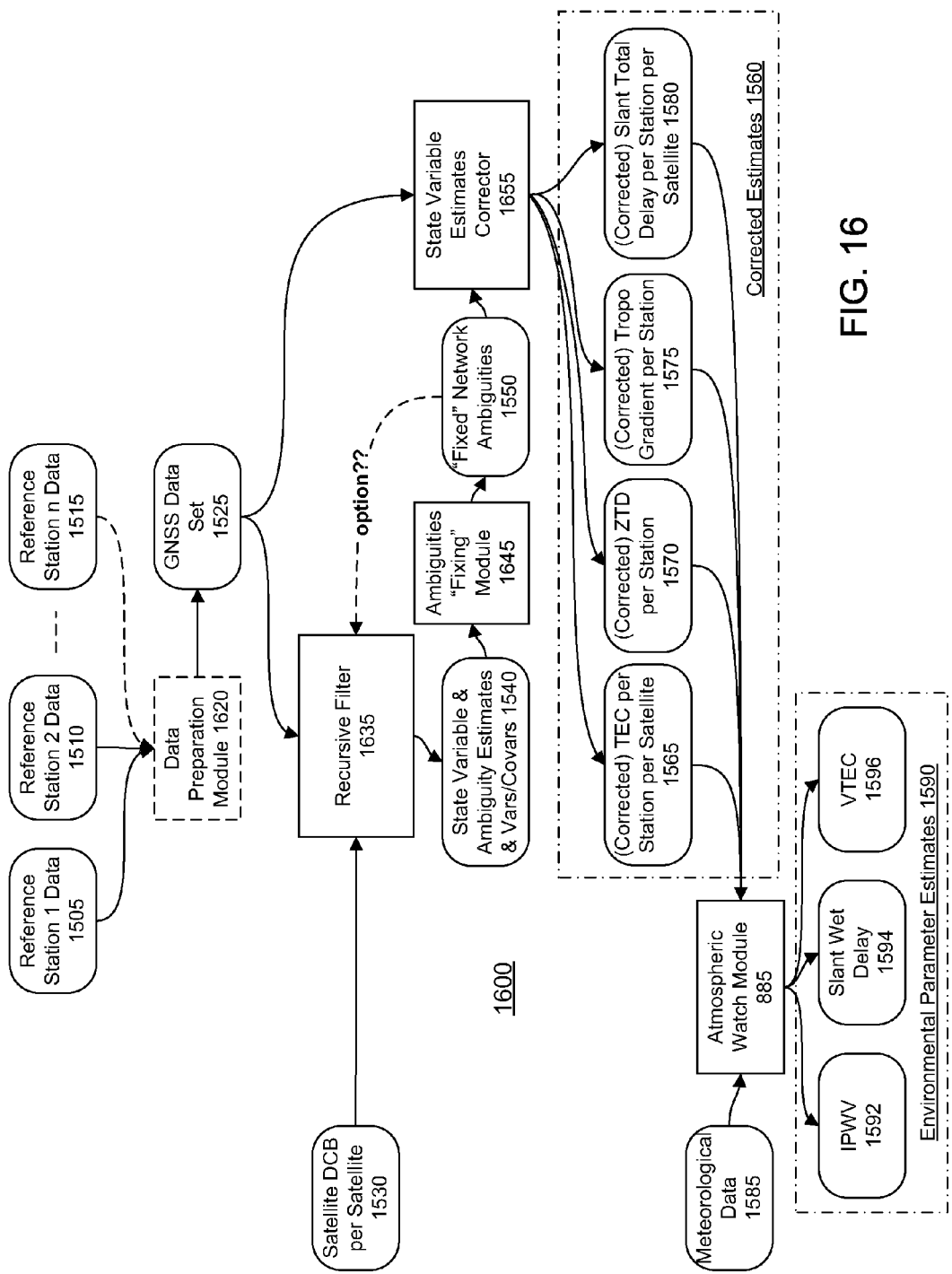
FIG. 16 is a schematic diagram of a system for estimating environmental parameter values using fixed ambiguities in accordance with some embodiments of the invention.

FIG. 16 is a schematic diagram of a system for estimating environmental parameter values using fixed ambiguities in accordance with some embodiments of the invention. An optional data preparation module 1620 prepares (e.g., synchronizes) data 1505, 1510, . . . 1515 representing measurements of signals from GNSS satellites collected by receivers of a reference station network distributed over a region and makes the prepared data available as a GNSS data set 1525 for processing by epoch. A recursive filter 1635 (e.g., one or more Least Squares adaptive filters or Kalman filters) is applied to the GNSS data 1525 as adjusted by satellite DCBs 1530 to estimate values at each epoch for a set of state variables 1540. State variables 1540 include at least one of (i) a total electron count (TEC) per station per satellite, (ii) a zenith total delay (ZTD) per station, (iii) a zenith total delay (ZTD) per station and a set of tropospheric gradients per station, and (iv) a slant total delay per station per satellite. Filter 1635 also estimates float values for ambiguities and associated statistical information (variance/covariance values).

An ambiguities "fixing" module 1645 "fixes" the float-value ambiguity estimates to form a set of "fixed" network ambiguities 1550. A state-variable estimates corrector 1655 uses the "fixed" network ambiguities 1550 to estimate corrected values 1560 for the state variables. Optionally, atmospheric watch module 885 uses the resulting corrected values 1560 for the state variables (at least one of: (i) corrected total electron count (TEC) per station per satellite 1565, (ii) corrected zenith total delay (ZTD) per station 1570, (iii) corrected zenith total delay (ZTD) per station 1570 and corrected tropospheric gradients per station 1575, and (iv) corrected slant total delay per station per satellite 1580), and meteorological data 1585 from external sources, to determine environmental parameter values 1590 over the region for at least one of (1) integrated precipitable water vapor (IPWV) 1592 and (2) tropospheric slant wet delay 1594. The meteorological data 1585 for locations within the region comprise, e.g., meteorological data from measurements and/or models and optionally from radiosonde soundings. Optionally, the atmospheric watch process or another process determines values 1596 of vertical total electron content (VTEC) per station from the values of total electron count per station per satellite (TEC) 1565.

Figure 17:
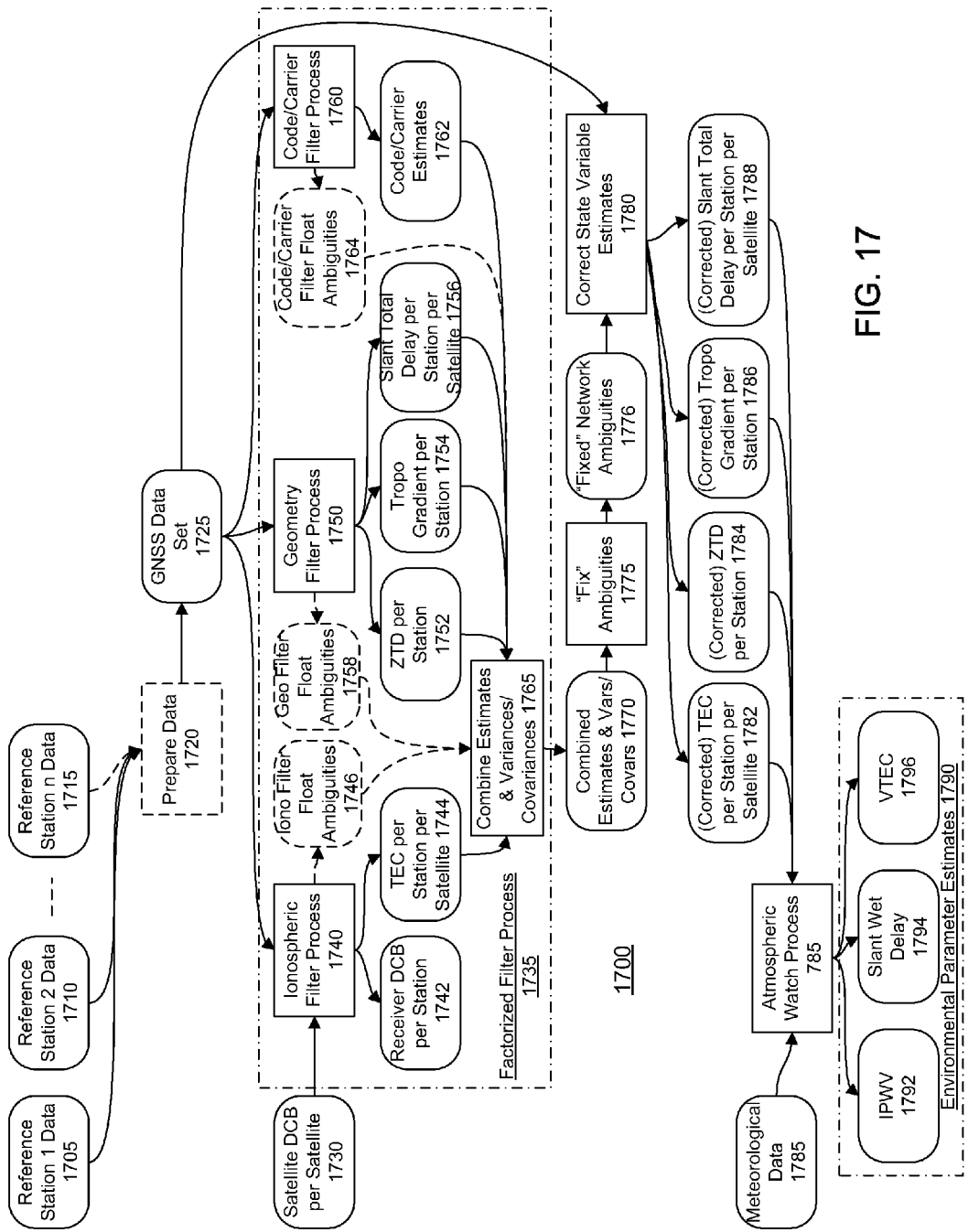
FIG. 17 is a flow chart of a process 1700 for estimating environmental parameters using fixed ambiguities in accordance with some embodiments of the invention.

FIG. 17 is a flow chart of a process 1700 for estimating environmental parameters using fixed ambiguities in accordance with some embodiments of the invention. Data 1705, 1710, . . . 1715 representing measurements of signals from GNSS satellites collected by receivers of a reference station network distributed over a region are optionally prepared at 1720 (e.g., synchronized by epoch) and made available as a GNSS data set 1725 for processing by epoch. A set of satellite DCBs 1730, one per satellite, is obtained, e.g., downloaded from the International GNSS Service (IGS) or computed from observations of a global network of receivers such as that shown in FIG. 600 and added to the pseudorange observations.

At 1735, recursive filtering is performed using factorized filter processes applied to the GNSS data 1725 to estimate values for a set of state variables at each epoch. An ionospheric process 1740 uses an ionospheric (geometry-free) observation combination, adjusted by the satellite DCBs 1730, to estimate values 1742 for a receiver differential code bias (DCB) per station, optionally values 1744 for total electron count per station per satellite, and float values 1746 for the ionospheric-combination ambiguities, along with associated statistical information. A geometry-filter process 1750 uses an ionospheric-free (geometric) observation combination to estimate values for atmospheric parameters (comprising at least one of zenith total delay (ZTD) per station 1752, zenith total delay (ZTD) per station and values 1754 for tropospheric gradient per station, values 1756 for slant total delay per station), and float values 1750 for the geometric-combination ambiguities, along with associated statistical information. A code/carrier filter process 1760 uses a code/carrier observation combination to estimate values 1762 for the code/carrier parameters and float values 1764 for the code/carrier-combination ambiguities, along with associated statistical information. At 1765 the estimates and the associated statistical information are combined to form a combined set 1770 of estimates with associated statistical information (e.g., a variance/covariance matrix).

Factorized filtering can be performed as described in U.S. Pat. No. 7,432,853 (TNL A-1403US), except that here the GNSS data applied to the ionospheric filter process is adjusted by the satellite DCBs. In some embodiments, the ionospheric filtering of U.S. Pat. No. 7,432,853 is replaced with the federated ionospheric filtering process described above. In some embodiments, the geometry filtering process of U.S. Pat. No. 7,432,853 is replaced with the federated geometry filter process of United States Patent Application Publication US 2009/0027625 A1 (TNL A-1789US).

The combined array 1770 of ambiguity estimates for all carrier phase observations and associated statistical information are used at 1775 to "fix" the ambiguity values. The resulting "fixed" network ambiguities 1776 are used at 1780 to estimate corrected values for the environmental state variables. The resulting corrected values for the environmental state variables (at least one of (i) corrected total electron count (TEC) per station per satellite 1782, (ii) corrected values 1784 of zenith total delay (ZTD) per station, (iii) corrected values 1784 of zenith total delay (ZTD) per station and corrected values 1786 of a set of tropospheric gradients per station, and (iv) corrected values 1788 of slant total delay per station per satellite), together with meteorological data 1785 from external sources, are optionally supplied to an atmospheric watch process, e.g., process 785 of FIG. 7. Optional process 785 uses the corrected values to determine values 1792 for at least one of (1) integrated precipitable water vapor (IPWV), (2) values 1794 for tropospheric slant wet delay, and (3) values 1796 for vertical total electron count (VTEC). The meteorological data 1785 comprise, e.g., meteorological data from measurements at locations within the region and/or models and optionally from radiosonde soundings.

Figure 18:
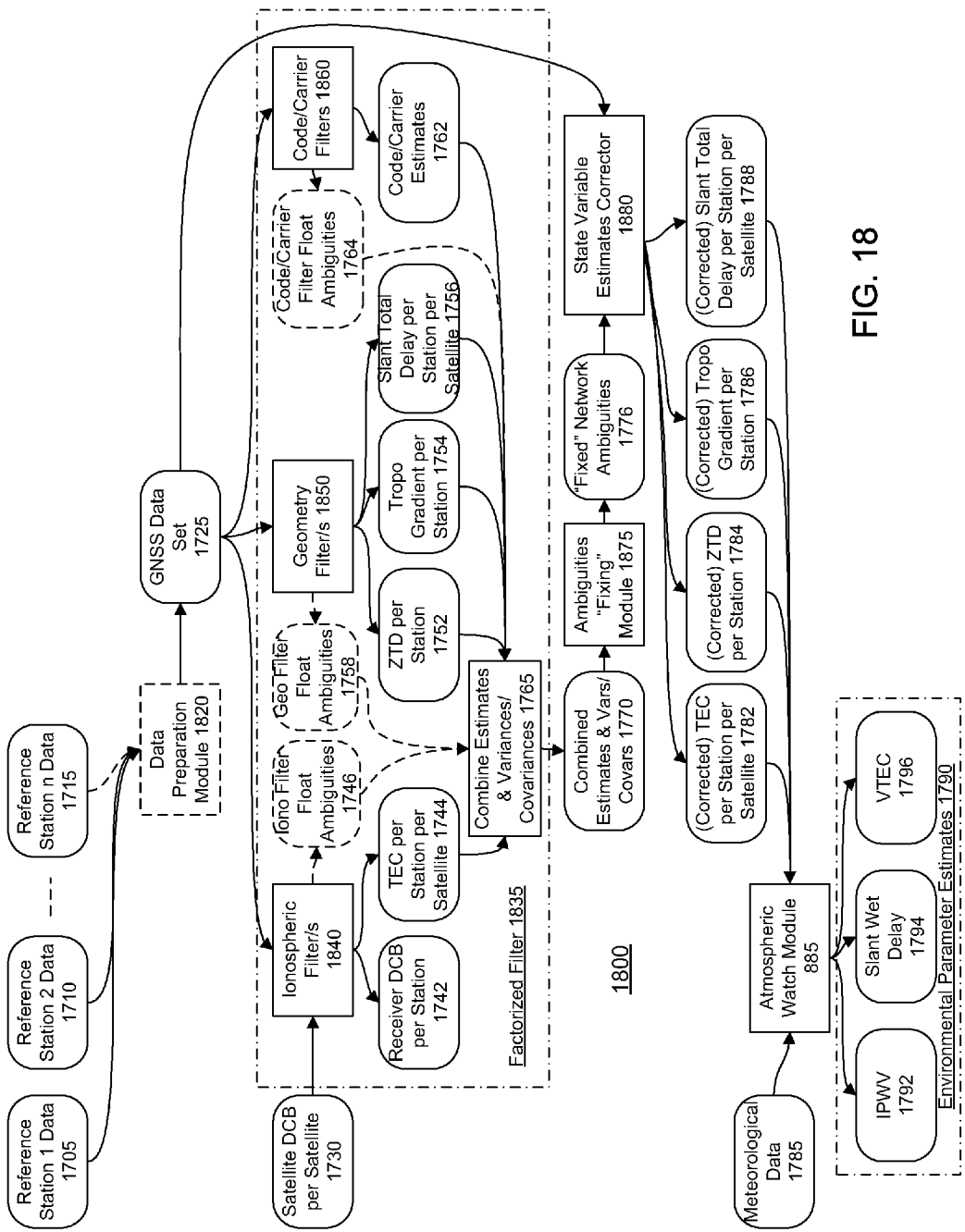
FIG. 18 is a schematic diagram of a system for estimating environmental parameters using fixed ambiguities in accordance with some embodiments of the invention.

FIG. 18 is a schematic diagram of a system for estimating environmental parameters using fixed ambiguities in accordance with some embodiments of the invention. A data preparation module 1820 prepares (e.g., synchronizes) data 1705, 1710, . . . 1715 representing measurements of signals from GNSS satellites collected by receivers of a reference station network distributed over a region and makes these available as a GNSS data set 1725 for processing by epoch. A factorized filter 1835 is uses the GNSS data 1725 to estimate values for a set of state variables at each epoch. Factorized filter 1835 includes one or more ionospheric filters 1840 which use an ionospheric (geometry-free) observation combination, adjusted by the satellite DCBs 1730, to estimate values 1742 for a receiver differential code bias (DCB) per station, optionally values 1744 for total electron count per station per satellite, and float values 1746 for the ionospheric-combination ambiguities, along with associated statistical information. Factorized filter 1835 includes a geometry-filter 1850 which uses an ionospheric-free (geometric) observation combination to estimate values for atmospheric parameters (comprising at least one of (i) zenith total delay (ZTD) per station 1752, (ii) zenith total delay (ZTD) per station 1752 and tropospheric gradient per station 1754, and (iii) slant total delay per station 1754), and float values 1750 for the geometric-combination ambiguities, along with associated statistical information. Factorized filter 1835 includes code/carrier filters 1860 which use a code/carrier observation combination to estimate values 1762 for the code/carrier parameters and float values 1764 for the code/carrier-combination ambiguities, along with associated statistical information. A combiner 1865 combines the estimates and the associated statistical information into a combined set 1770 of estimates with associated statistical information (e.g., a variance/covariance matrix).

Factorized filter 1835 can be implemented as described in U.S. Pat. No. 7,432,853 (TNL A-1403US), except that here the GNSS data (the ionospheric combination) applied to the ionospheric filter(s) 1840 is adjusted by the satellite DCBs. In some embodiments, the ionospheric filters 1840 of U.S. Pat. No. 7,432,853 are replaced with the federated ionospheric filter described above. In some embodiments, the geometry filter of U.S. Pat. No. 7,432,853 is replaced with the federated geometry filter of United States Patent Application Publication US 2009/0027625 A1 (TNL A-1789US).

An ambiguities "fixing" module 1875 "fixes" the ambiguities of the combined array 1770. A corrector 1880 uses the "fixed" network ambiguities 1776 to estimate corrected values for the environmental state variables. Optionally, atmospheric watch module 885 uses the corrected environmental state values (at least one of (i) values 1782 of total electron count (TEC) per station per satellite, (ii) corrected values 1784 of zenith total delay (ZTD) per station, (iii) corrected values 1784 of zenith total delay (ZTD) per station and corrected values 1786 of tropospheric gradients per station, and (iv) corrected values 1788 of slant total delay per station per satellite), together with meteorological data 1785 from external sources, to determine environmental parameter estimates 1790. Optional estimates 1790 include values for at least one of (1) integrated precipitable water vapor (IPWV) 1792, (2) tropospheric slant wet delay 1794, and (iv) vertical total electron count (VTEC) 1796. The meteorological data 1785 comprise, e.g., meteorological data from measurements at locations within the region and/or models and optionally from radiosonde soundings.

The terms "fix," "fixed" and "fixing" as used herein include fixing of ambiguities to integer values using techniques such as rounding, bootstrapping and Lambda search, and also include forming a weighted average of integer candidates while not necessarily fixing them to integer values. The weighted average approach is described in detail in International Patent Publications WO 2010/021656 A2, WO 2010/021658 A2, WO 2010/021659 A2, WO 2010/021657 A2, and WO 2010/021660 A2, incorporated herein by reference. Some embodiments "fix" ambiguities using any suitable techniques known in the art, such as Simple rounding, Bootstrapping, Integer Least Squares based on the Lambda Method, or Best Integer Equivariant. See Teunissen, P. J. G, S. Verhagen (2009); *GNSS Carrier Phase Ambiguity Resolution: Challenges and Open Problems*, in M. G. Sideris (ed.); Observing our Changing Earth, International Association of Geodesy Symposia 133, Springer Verlag Berlin-Heidelberg 2009; and Verhagen, Sandra (2005): The GNSS integer ambiguities: estimation and validation, Publications on Geodesy 58, Delft, 2005, 194 pages, ISBN-13: 978 90 6132 290 0. ISBN-10: 90 6132 290 1.

$N_1$ and $N_2$ are $L_1$ and $L_2$ integer ambiguities, $v_1$ and $v_2$ are $L_1$ and $L_2$ phase noise plus multipath, and $\epsilon_7$ and $\epsilon_2$ are $L_1$ and $L_2$ code noise plus multipath.

The carrier-phase observations of Eqs. (7) and (8) show the L1 and L2 ambiguities as $N_1$ and $N_2$, respectively. Eq. (7) shows the mapping between $N_1$ and $N_2$. For a network of n stations observing m satellites, the m×n ambiguities on each of the carrier frequencies, e.g., on L1 and L2, can be expressed in various ways. Linear combinations of observations result in corresponding combinations of the ambiguities from which the uncombined ambiguities can be derived. For example, a single large recursive filter as in the example of FIG. E can be configured to directly estimate the uncombined ambiguities. In the example of FIG. F using factorized filters, each of the factorized filters estimates a different linear combination of the ambiguities, e.g., widelane, narrowlane, and code/carrier combinations. Alternately, the ambiguities can be expressed as baseline-to-baseline combinations, where each baseline corresponds to a respective pair of the network receivers. The present invention is intended to include estimation of any combinations of ambiguities which are equivalent to fixing uncombined ambiguities across the network. Discussion of some of the linear combinations is found, for example, in Chapter 2 of Bernese Software from the Astronomical Institute, University of Bern, Version 5.0, January 2007.

Part 7: Receiver and Processing Apparatus

Figure 19:
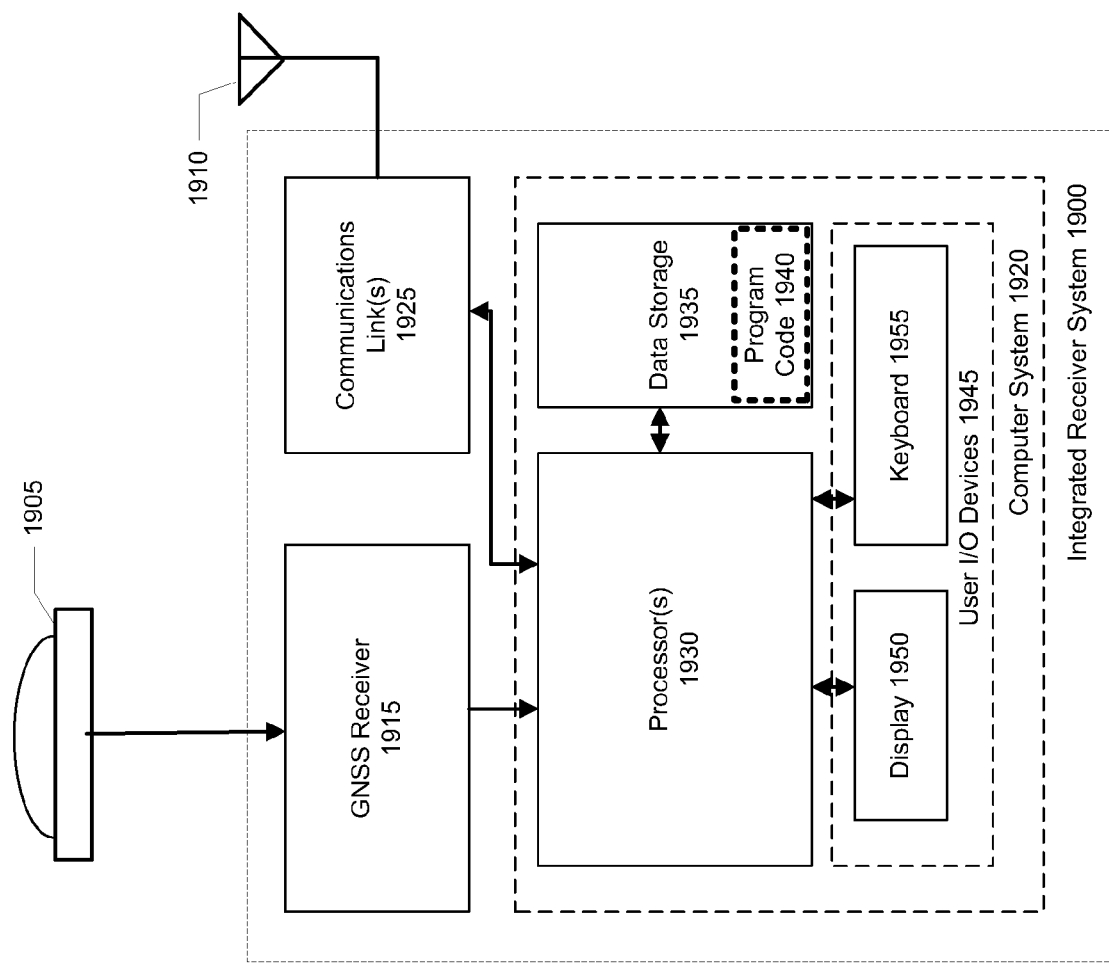
FIG. 19 is a block diagram of an integrated GNSS receiver system.

FIG. 19 is a block diagram of a typical integrated GNSS receiver system 1900 with GNSS antenna 1905 and communications antenna 1910. The Trimble R8 GNSS System is an example of such a system. Receiver system 1900 can serve as a network reference station. Receiver system 1900 includes a GNSS receiver 1915, a computer system 1920 and one or more communications links 1925. Computer system 1920 includes one or more processors 1930, one or more data storage elements 1935, program code 1940 with instructions for controlling the processor(s) 1930, and user input/output devices 1945 which may include one or more output devices 1950 such as a display or speaker or printer and one or more devices 1955 for receiving user input such as a keyboard or touch pad or mouse or microphone.

Figure 20:
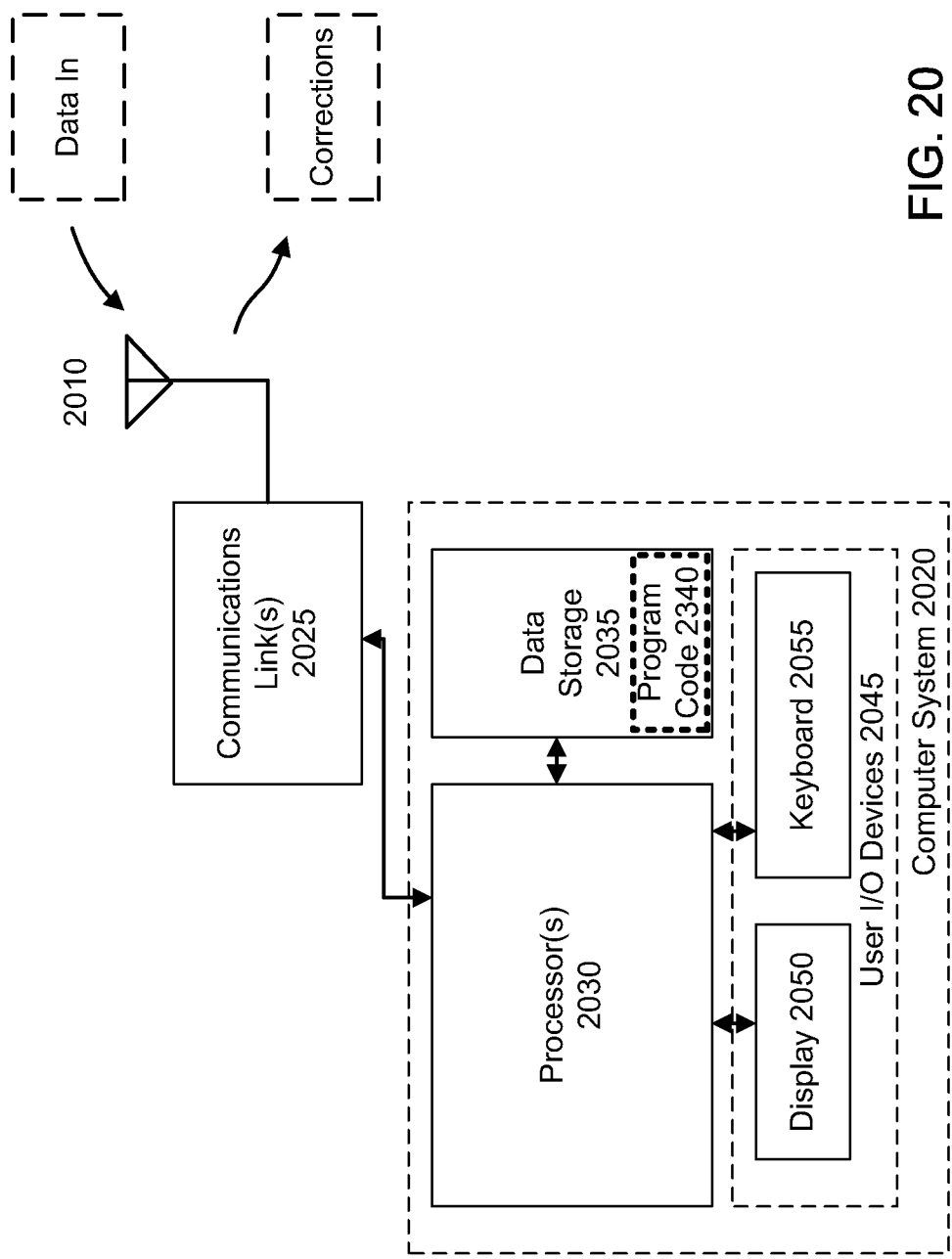
FIG. 20 is a schematic diagram of a computer system.

FIG. 20 is a schematic diagram of a computer system 2020 in accordance with some embodiments of the invention. Computer system 2020 includes one or more processors 2030, one or more data storage elements 2035, program code 2040 with instructions for controlling the processor(s) 2030, and user input/output devices 2045 which may include one or more output devices 2050 such as a display or speaker or printer and one or more devices 2055 for receiving user input such as a keyboard or touch pad or mouse or microphone. Computer system 2020 may also have one or more communications links for exchanging data with other systems, e.g., via internet and/or other channels.

Part 8: General Remarks

The inventive concepts can be employed in a wide variety of processes and equipment for real-time operation (no more than 5 seconds). Using the federated filter approach and factorized UD filter greatly reduces the computation load for large GNSS network and is suitable to run with modern multi-core computer with parallel computation technique (i.e. by using OpenMP library). Shorter time delay is crutial to life critical application like flood and weather predition near an airport. Some exemplary embodiments will now be described. It will be understood that these are intended to illustrate rather than to limit the scope of the invention.

Those of ordinary skill in the art will realize that the detailed description of embodiments of the present invention is illustrative only and is not intended to be in any way limiting. Other embodiments of the present invention will readily suggest themselves to such skilled persons having the benefit of this disclosure. For example, while a iono-free phase combination is employed in some examples, those of skill in the art will recognized that many phase combinations are possible and that a combination other than a iono-free phase combination can produce acceptable if less than optimum results; thus the claims are not intended to be limited to iono-free phase combinations other than where expressly called for. Reference is made in detail to implementations of the present invention as illustrated in the accompanying drawings. The same reference indicators are used throughout the drawings and the following detailed description to refer to the same or like parts.

In the interest of clarity, not all of the routine features of the implementations described herein are shown and described. It will be appreciated that in the development of any such actual implementation, numerous implementation-specific decisions must be made to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Global Navigation Satellite Systems (GNSS) include the Global Positioning System (GPS), the Glonass system, the proposed Galileo system, the proposed Compass system, and others. Each GPS satellite transmits continuously using two radio frequencies in the L-band, referred to as L1 and L2, at respective frequencies of 1575.41 MHz and 1227.60 MHz. Some GPS satellites also transmit on a third radio frequency in the L-band, referred to as L5 at 1176.45 MHz. Each GNSS likewise has satellites which transmit multiple signals on multiple carrier frequencies. Embodiments of the present invention are not limited to any specific GNSS, or to L1 and L2 frequencies. For example, the invention may be used with other combinations of frequencies, such as GPS L1 and L5, or combinations of Glonass frequencies, combinations of Galileo frequencies, or combinations of frequencies of any other GNSS.

In accordance with embodiments of the present invention, the components, process steps and/or data structures may be implemented using various types of operating systems (OS), computer platforms, firmware, computer programs, computer languages and/or general-purpose machines. The methods can be run as a programmed process running on processing circuitry. The processing circuitry can take the form of numerous combinations of processors and operating systems, or a stand-alone device. The processes can be implemented as instructions executed by such hardware, by hardware alone, or by any combination thereof. The software may be stored on a program storage device readable by a machine. Computational elements, such as filters and banks of filters, can be readily implemented using an object-oriented programming language such that each required filter is instantiated as needed.

Those of skill in the art will recognize that devices of a less general-purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with an embodiment of the present invention, the methods may be implemented on a data processing computer such as a personal computer, workstation computer, mainframe computer, or high-performance server running an OS such as Microsoft® Windows® XP and Windows® 2000, available from Microsoft Corporation of Redmond, Wash., or Solaris® available from Sun Microsystems, Inc. of Santa Clara, Calif., or various versions of the Unix operating system such as Linux available from a number of vendors. The methods may also be implemented on a multiple-processor system, or in a computing environment including various peripherals such as input devices, output devices, displays, pointing devices, memories, storage devices, media interfaces for transferring data to and from the processor(s), and the like. Such a computer system or computing environment may be networked locally, or over the Internet.

Any of the above-described methods and their embodiments may be implemented by means of a computer program. The computer program may be loaded on an apparatus, a rover, a reference receiver or a network station as described above. Therefore, the invention also relates to a computer program, which, when carried out on an apparatus, a rover, a reference receiver or a network station as described above, carries out any one of the above above-described methods and their embodiments.

The invention also relates to a computer-readable medium or a computer-program product including the above-mentioned computer program. The computer-readable medium or computer-program product may for instance be a magnetic tape, an optical memory disk, a magnetic disk, a magneto-optical disk, a CD ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a firmware update adapted to be installed on receivers already in the field, i.e. a computer program which is delivered to the field as a computer program product. This applies to each of the above-described methods and apparatuses.

GNSS receivers may include an antenna, configured to received the signals at the frequencies broadcasted by the satellites, processor units, one or more accurate clocks (such as crystal oscillators), one or more computer processing units (CPU), one or more memory units (RAM, ROM, flash memory, or the like), and a display for displaying position information to a user.

Where the terms "receiver", "filter" and "processing element" are used herein as units of an apparatus, no restriction is made regarding how distributed the constituent parts of a unit may be. That is, the constituent parts of a unit may be distributed in different software or hardware components or devices for bringing about the intended function. Furthermore, the units may be gathered together for performing their functions by means of a combined, single unit. For instance, the receiver, the filter and the processing element may be combined to form a single unit, to perform the combined functionalities of the units.

The above-mentioned units may be implemented using hardware, software, a combination of hardware and software, pre-programmed ASICs (application-specific integrated circuit), etc. A unit may include a computer processing unit (CPU), a storage unit, input/output (I/O) units, network connection units, etc.

Although the present invention has been described on the basis of detailed examples, the detailed examples only serve to provide the skilled person with a better understanding, and are not intended to limit the scope of the invention. The scope of the invention is much rather defined by the appended claims.

Part 9: Summary of Inventive Concepts

Following is a summary of some of the inventive concepts described herein

Part 9A: [Float Solution with Federated Ionospheric Filter]
1. A method of processing GNSS signal data to estimate environmental parameter values, comprising
    obtaining GNSS data collected at a plurality of stations distributed over a region from signals received from GNSS satellites over multiple epochs,
    obtaining a satellite differential code bias (DCB) per satellite, and
    estimating a receiver differential code bias per station and a value of total electron content (TEC) per station per satellite from the GNSS data and the satellite differential code biases using a federated ionospheric filter.
2. The method of 1, further comprising
    applying a geometric filter to estimate from the GNSS data a set of values for atmospheric parameters comprising at least one of: (i) a zenith total delay per station, (ii) a zenith total delay per station and a set of tropospheric gradients per station, and (iii) a slant total delay per station per satellite,
    obtaining meteorological data for locations within the region, and
    determining values over the region for at least one of: (1) integrated precipitable water vapor (IPWV) and (2) tropospheric slant wet delay, from the set of values for atmospheric parameters and the meteorological data.
3. The method of 1 or 2, wherein obtaining a satellite differential code bias per satellite comprises one of (i) retrieving a satellite differential code bias per satellite from an external source, and (ii) computing a satellite differential code bias per satellite from GNSS data collected at a network of reference stations.
4. The method of one of 1-3, wherein estimating a value of total electron content per station per satellite comprises
    estimating values for ionospheric model parameters and for a stochastic ionospheric delay term per satellite per station in the federated ionospheric filter, and
    determining the value of total electron content per station per satellite from the estimated values for the ionospheric model parameters and the stochastic ionospheric delay terms.
5. The method of one of 1-4, wherein applying a federated ionospheric filter comprises:
    for each satellite,
        applying to the GNSS signal data an ionospheric sub-filter to estimate values for local states representing parameters unique to that satellite and values for common states representing parameters common to all receivers,
        providing values for the common states and associated statistical information to a master filter; and
        preparing updated estimates for the local states when updated values for the common states are provided by the master filter; and
    applying to the values for the common states and the associated statistical information a master filter to estimate updated values for the common states, and to provide the updated values to the ionospheric subfilters.

6. The method of 5, wherein the states unique to the satellite comprise: a set of parameters characterizing ionosphere across the region, a stochastic ionospheric delay term per station per satellite, and an integer ambiguity per station per satellite.
7. The method of one of 5-6, wherein the states common to all satellites comprise a receiver differential code bias per station.
8. The method of 5, further comprising: resetting states in the master filter to zero with infinite variance before any observation update at each epoch, and then applying the decorrelated observations from each subfilter to the master filter
9. The method of one of 1-8, wherein the value of total electron content per station per satellite comprises a value mapped to vertical.
10. The method of one of 2-9, wherein obtaining meteorological data comprises obtaining surface meteorological data for locations within the region.
11. The method of one of 2-10, wherein obtaining meteorological data comprises obtaining radiosonde temperature data for locations within the region.
12. The method of one of 1-11, wherein elapsed time between obtaining the GNSS data and determining values over the region for total electron content is no more than about five seconds.
13. The method of one of 2-11, wherein elapsed time between obtaining the GNSS data and determining values over the region for total electron content and at least one of integrated precipitable water vapor and tropospheric slant delay is no more than about five seconds.
14. Apparatus for processing GNSS signal data to estimate environmental parameter values, comprising a federated ionospheric filter adapted to estimate a receiver differential code bias per station and a value of total electron content (TEC) per station per satellite from satellite differential code biases and the GNSS signal data.
15. The apparatus of 14, further comprising:
  a geometric filter adapted to estimate from the GNSS data a set of values for atmospheric parameters comprising at least one of: (i) a zenith total delay per station, (ii) a zenith total delay per station and a set of tropospheric gradients per station, and (iii) a slant total delay per station per satellite, and
  an atmospheric watch module to determine values over the region for integrated precipitable water vapor and tropospheric slant wet delay, from the estimated values for atmospheric parameters and meteorological data for the region.
16. The apparatus of one of 14-15, further comprising an element to obtain a code bias per satellite by one of (i) retrieving a code bias per satellite from an external source, and (ii) computing a code bias per satellite from GNSS data collected at a network of GNSS reference stations.
17. The apparatus of one of 14-16, comprising:
  a module to estimate values for ionospheric model parameters and for a stochastic ionospheric delay term per satellite per station, and
  a module to determine the value of total electron content per station per satellite from the estimated values for the ionospheric model parameters and the stochastic ionospheric delay terms.
18. The apparatus of one of 14-17, wherein the federated ionospheric filter comprises:
  an ionospheric subfilter for each satellite adapted to
    estimate values for local states representing parameters unique to that satellite and values for common states representing parameters common to all receivers, from the GNSS signal data and a satellite differential code bias,
    provide values for the common states and associated statistical information to master filter; and
    prepare updated estimates for the local states when updated values for the common states are provided by the master filter; and
  a master filter adapted to estimate updated values for the common states from the values for the common states and the associated statistical information, and to provide the updated values to the ionospheric subfilters.
19. The apparatus of 18, wherein the states unique to the satellite comprise: a set of parameters characterizing ionosphere across the region, a stochastic ionospheric delay term per station per satellite, and an integer ambiguity per station per satellite.
20. The apparatus of one of 18-19, wherein the states common to all satellites comprise a receiver differential code bias per station.
21. The apparatus of 18, wherein the federated ionospheric filter is operative to reset states in the master filter to zero with infinite variance before observation update at each epoch, and then to apply the decorrelated observations from each subfilter to the master filter.
22. The apparatus of one of 14-21, wherein the value of total electron content per station per satellite comprises a value mapped to vertical.
23. The apparatus of one of 14-22, wherein the meteorological watch module is adapted to use surface meteorological data for locations within the region as at least a subset of the meteorological data.
24. The apparatus of one of 14-23, wherein the meteorological watch module is adapted to use radiosonde sounding data as at least a subset of the meteorological data.
25. The apparatus of one of 14-24, wherein elapsed time between obtaining the GNSS data and determining values over the region for total electron content is no more than about five seconds.
26. The apparatus of one of 14-24, wherein elapsed time between obtaining the GNSS data and determining values over the region for total electron content and at least one of integrated precipitable water vapor and tropospheric slant wet delay is no more than about five seconds.
27. A computer program product comprising: a computer usable medium having computer readable instructions physically embodied therein, the computer readable instructions when executed by a processor enabling the processor to perform the method of one of 1-13.
28. A computer program comprising a set of instructions which when loaded in and executed by a processor enable the processor to perform the method of one of 1-13.

Part 9B: [Realtime Estimation with Ambiguity Fixing]
1. A method of processing GNSS signal data to estimate environmental parameter values, comprising
  obtaining GNSS data collected at a plurality of stations distributed over a region from signals received from GNSS satellites over multiple epochs,
  obtaining a satellite code bias per satellite,
  estimating from the GNSS data and the satellite code biases a set of float ambiguities per station per satellite and values for atmospheric parameters comprising at least one of: (i) a total electron content per station per satellite, (ii) a zenith total delay per station, (iii) a zenith total delay per station and a set of tropospheric gradients per station, and (iv) a slant total delay per station per satellite,
fixing the ambiguities, and
estimating from the GNSS data and the fixed ambiguities corrected values for the atmospheric parameters.

2. The method of 1, further comprising:
obtaining meteorological data for locations within the region, and
determining values over the region for at least one of integrated precipitable water vapor and tropospheric slant wet delay, from the corrected values for the atmospheric parameters.

3. The method of 1 or 2, wherein estimating the set of float ambiguities and values for atmospheric parameters comprises applying at least one iterative filter to the GNSS data and the satellite code biases.

4. The method of one of 1-3, wherein estimating the set of float ambiguities and values for atmospheric parameters comprises applying a set of factorized filters to the GNSS data and the satellite code biases.

5. The method of one of 1-4, wherein estimating the set of float ambiguities and values for atmospheric parameters comprises applying a federated ionospheric filter to the GNSS data and the satellite code biases.

6. The method of one of 1-5, wherein the value of total electron content per station per satellite comprises a value mapped to vertical.

7. The method of one of 1-6, wherein obtaining meteorological data comprises obtaining surface meteorological data for locations within the region.

8. The method of one of 1-7, wherein obtaining meteorological data comprises obtaining radiosonde temperature data for locations within the region.

9. The method of one of 1-8, wherein elapsed time between obtaining the GNSS data and determining the corrected values for the atmospheric parameters is no more than about 5 seconds.

10. The method of one of 1-9, wherein elapsed time between obtaining the GNSS data and determining values over the region for at least one of integrated precipitable water vapor and tropospheric slant wet delay is no more than about 5 seconds.

11. Apparatus for processing GNSS signal data to estimate environmental parameter values, comprising
at least one recursive filter to estimate from satellite differential code biases and from the GNSS signal data a set of float ambiguities per station per satellite, and values for atmospheric parameters comprising at least one of: (i) a total electron content per station per satellite, (ii) a zenith total delay per station, (iii) a zenith total delay per station and a set of tropospheric gradients per station, (iv) a slant tropospheric total delay per station per satellite, and (v) a total electron content per station per satellite.
an ambiguity-fixing module to prepare fixed ambiguities from the float ambiguities, and
a corrector module to prepare from the GNSS data and the fixed ambiguities corrected values for the atmospheric parameters.

12. The apparatus of 11, further comprising:
a meteorological watch module to determine values for at least one of integrated precipitable water vapor and tropospheric slant wet delay from the corrected values for the atmospheric parameters and from meteorological data.

13. The apparatus of one of 11-12, wherein the at least one recursive filter comprises a Kalman filter.

14. The apparatus of one of 11-13, wherein the at least one recursive filter comprises a set of factorized filters.

15. The apparatus of one of 11-14, wherein the at least one recursive filter comprises a federated ionospheric filter.

16. The apparatus of one of 11-15, wherein the value of total electron content per station per satellite comprises a value mapped to vertical.

17. The apparatus of one of 11-16, wherein the meteorological watch module is operative to process meteorological data comprising surface meteorological data for locations within the region.

18. The apparatus of one of 11-17, wherein the meteorological watch module is operative to process meteorological data comprising radiosonde sounding data for locations within the region.

19. The apparatus of one of 11-18, wherein elapsed time between obtaining the GNSS data and determining the corrected values over the region for the atmospheric parameters is no more than about 5 seconds.

20. The apparatus of one of 11-19, wherein elapsed time between obtaining the GNSS data and determining the corrected values over the region for at least one of integrated precipitable water vapor and tropospheric slant wet delay is no more than about five seconds 21. A computer program product comprising: a computer usable medium having computer readable instructions physically embodied therein, the computer readable instructions when executed by a processor enabling the processor to perform the method of one of 1-10.

22. A computer program comprising a set of instructions which when loaded in and executed by a processor enable the processor to perform the method of one of 1-10.

The invention claimed is:

1. A method of operating a processor having associated data storage and program code enabling the processor to estimate environmental parameter values from GNSS signal data, comprising;
obtaining GNSS data collected at a plurality of stations distributed over a region from signals received from GNSS satellites over multiple epochs,
obtaining a satellite differential code bias (DCB) per satellite,
applying a federated ionospheric filter operated by the processor to estimate (i) a receiver DCB per station from the GNSS data and the satellite DCB per satellite, and (ii) a total electron content (TEC) per station per satellite from the GNSS data and the satellite DCB per satellite, the TEC comprising a number of electrons in a column with a cross-sectional area of one square meter centered on a signal path.

2. The method of claim 1, further comprising:
applying a geometric filter operated by the processor to estimate from the GNSS data a set of values for atmospheric parameters comprising at least one of: (i) a zenith tropospheric delay per station, (ii) a zenith tropospheric delay per station and a set of tropospheric gradients per station, and (iii) a slant total delay per station per satellite,
obtaining meteorological data for locations within the region, and operating the processor to determine values over the region for at least one of: (1) integrated precipitable water vapor (IPWV) and (2) tropospheric slant wet delay, from the set of values for atmospheric parameters and from the meteorological data.

3. The method of claim 1, wherein obtaining the satellite DCB per satellite comprises one of (i) retrieving a satellite DCB per satellite from an external source, and (ii) operating the processor to compute a satellite DCB per satellite from the GNSS data collected at a network of reference stations.

4. The method of claim 1, wherein applying a federated ionospheric filter operated by the processor to estimate the TEC per station per satellite comprises:
estimating values for ionospheric model parameters and for a stochastic ionospheric delay term per satellite per station in the federated ionospheric filter, and
determining the TEC per station per satellite from the estimated values for the ionospheric model parameters and the stochastic ionospheric delay terms.

5. The method of claim 1, wherein applying a federated ionospheric filter operated by the processor comprises:
for each satellite,
applying to the GNSS signal data an ionospheric subfilter operated by the processor to estimate values for local states representing parameters unique to that satellite and values for common states representing parameters common to all receivers,
providing values for the common states and associated statistical information to a master filter operated by the processor; and
preparing updated estimates for the local states when updated values for the common states are provided by the master filter; and
applying the master filter operated by the processor to the values for the common states and the associated statistical information to estimate updated values for the common states, and to provide the updated values to the ionospheric subfilters operated by the processor.

6. The method of claim 1, wherein the TEC per station per satellite comprises a value mapped to vertical.

7. The method of claim 2, wherein obtaining meteorological data comprises obtaining surface meteorological data for locations within the region.

8. The method of claim 2, wherein obtaining meteorological data comprises obtaining radiosonde temperature data for locations within the region.

9. The method of claim 1, wherein elapsed time between obtaining the GNSS data and determining values over the region for the TEC is no more than about five seconds.

10. The method of claim 5, wherein the states unique to the satellite comprise: a set of parameters characterizing ionosphere across the region, a stochastic ionospheric delay term per station per satellite, and an integer ambiguity per station per satellite.

11. The method of claim 5, wherein the states common to all satellites comprise a receiver DCB per station.

12. The method of claim 5, further comprising: operating the processor to reset states in the master filter operated by the processor to zero with infinite variance before any observation update at each epoch, and then applying the decorrelated observations from each subfilter operated by the processor to the master filter operated by the processor.

13. The method of claim 2, wherein elapsed time between obtaining the GNSS data and determining values over the region for the TEC and at least one of the IPWV and the tropospheric slant wet delay is no more than about five seconds.

14. Apparatus for processing GNSS signal data to estimate environmental parameter values, comprising a federated ionospheric filter operative to estimate (i) a receiver differential code bias per station from satellite differential code biases and the GNSS signal data, and (ii) a total electron content (TEC) per station per satellite from the satellite differential code biases and the GNSS signal data, the TEC comprising a number of electrons in a column with a cross-sectional area of one square meter centered on a signal path.

15. The apparatus of claim 14, further comprising:
a geometric filter adapted to estimate from the GNSS signal data a set of values for atmospheric parameters comprising at least one of: (i) a zenith tropospheric delay per station, (ii) a zenith tropospheric delay per station and a set of tropospheric gradients per station, and (iii) a slant total delay per station per satellite, and
an atmospheric watch module to determine values over the region for at least one of (1) integrated precipitable water vapor and (2) tropospheric slant wet delay, from the estimated values for atmospheric parameters and from meteorological data for the region.

16. The apparatus of claim 14, further comprising an element to obtain a differential code bias per satellite by one of (i) retrieving a differential code bias per satellite from an external source, and (ii) computing a differential code bias per satellite from the GNSS signal data collected at a network of GNSS reference stations.

17. The apparatus of claim 14, comprising:
a module to estimate values for ionospheric model parameters and for a stochastic ionospheric delay term per satellite per station, and
a module to determine the TEC per station per satellite from the estimated values for the ionospheric model parameters and the stochastic ionospheric delay terms.

18. The apparatus of claim 14, wherein the federated ionospheric filter comprises:
an ionospheric subfilter for each satellite adapted to
estimate values for local states representing parameters unique to that satellite and values for common states representing parameters common to all receivers, from the GNSS signal data and a satellite differential code bias,
provide values for the common states and associated statistical information to master filter; and
prepare updated estimates for the local states when updated values for the common states are provided by the master filter; and
a master filter adapted to estimate updated values for the common states from the values for the common states and the associated statistical information, and to provide the updated values to the ionospheric subfilters.

19. The apparatus of claim 14, wherein the TEC per station per satellite comprises a value mapped to vertical.

20. The apparatus of claim 14, wherein the meteorological watch module is adapted to use surface meteorological data for locations within the region as at least a subset of the meteorological data.

21. The apparatus of claim 14, wherein the meteorological watch module is adapted to use radiosonde sounding data as at least a subset of the meteorological data.

22. The apparatus of claim 14, wherein elapsed time between obtaining the GNSS signal data and determining values over the region for the TEC is no more than about five seconds.

23. The apparatus of claim 14, wherein elapsed time between obtaining the GNSS signal data and determining values over the region for the TEC and at least one of integrated precipitable water vapor and tropospheric slant wet delay is no more than about five seconds.

24. The apparatus of claim 18, wherein the states unique to the satellite comprise: a set of parameters characterizing ionosphere across the region, a stochastic ionospheric delay term per station per satellite, and an integer ambiguity per station per satellite.

25. The apparatus of claim 18, wherein the states common to all satellites comprise a receiver differential code bias per station.

26. The apparatus of claim 18, wherein the federated ionospheric filter is operative to reset states in the master filter to zero with infinite variance before observation update at each epoch, and then to apply the decorrelated observations from each subfilter to the master filter.

27. A non-transitory computer readable medium containing computer executable instructions to perform a method, the method comprising:
- obtaining GNSS data collected at a plurality of stations distributed over a region from signals received from GNSS satellites over multiple epochs,
- obtaining a satellite differential code bias (DCB) per satellite, and
- operating a federated ionospheric filter to estimate (i) a receiver DCB per station from the GNSS data and the satellite DCB per satellite, and (ii) a total electron content (TEC) per station per satellite from the GNSS data and the satellite DCB per satellite, the TEC comprising a number of electrons in a column with a cross-sectional area of one square meter centered on a signal path.

* * * * *